US011314383B2

(12) United States Patent
Aroche Martinez et al.

(10) Patent No.: US 11,314,383 B2
(45) Date of Patent: Apr. 26, 2022

(54) STACKED MEDIA ELEMENTS WITH SELECTIVE PARALLAX EFFECTS

(71) Applicant: Apple Inc., Cupertino, CA (US)

(72) Inventors: Jose J. Aroche Martinez, San Jose, CA (US); Zachary P. Petersen, San Francisco, CA (US); Dale A. Taylor, San Carlos, CA (US); Leticia M. Alarcon, San Jose, CA (US); Dudley G. Wong, Sunnyvale, CA (US); Sean M. Harold, San Jose, CA (US); Ada Turner, Milpitas, CA (US); Oscar H. Walden, San Jose, CA (US); James C. Wilson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/799,349

(22) Filed: Feb. 24, 2020

(65) Prior Publication Data

US 2020/0301549 A1   Sep. 24, 2020

Related U.S. Application Data

(60) Provisional application No. 62/822,913, filed on Mar. 24, 2019.

(51) Int. Cl.
*G06F 3/0482* (2013.01)
*G06F 3/0484* (2013.01)
(Continued)

(52) U.S. Cl.
CPC ........ *G06F 3/0482* (2013.01); *G06F 3/04845* (2013.01); *G11B 27/02* (2013.01)

(58) Field of Classification Search
CPC .............. G06F 3/0482; G06F 3/04845; G06F 3/04842; G06F 3/04815; G06F 3/0481; G06F 3/0487; G06F 3/0488; G06F 3/013; G11B 27/02; G11B 27/11; G11B 27/34; G11B 27/031; G06T 15/20; G06T 15/503; H04N 21/4402; H04N 21/4398; H04N 21/4355; H04N 21/47205; H04N 13/156; H04N 13/312; G02B 30/40; G02B 30/52
See application file for complete search history.

(56) References Cited

U.S. PATENT DOCUMENTS 5,682,171 A   10/1997   Yokoi
7,136,069 B1  11/2006   Dawson
(Continued)

*Primary Examiner* — Jennifer N Welch
*Assistant Examiner* — Parmanand D Patel
(74) *Attorney, Agent, or Firm* — Kubota & Basol LLP

(57) ABSTRACT

According to one embodiment, a method includes obtaining a media composition for display on an electronic display device is obtained. The media composition includes a plurality of layers, with each layer including a visual element. The method also includes selecting at least some of the layers of the media composition to have a parallax effect applied thereto and determining an amount of total parallax effect to apply to the selected layers. Also, the method includes determining an appropriate amount of offset to apply to each of the selected layers on an individual basis and shifting the selected layers in one or more directions by their respective appropriate amounts. Moreover, the method includes displaying the media composition showing the parallax effect on the electronic display device.

20 Claims, 26 Drawing Sheets

(51) Int. Cl.
*G11B 27/02* (2006.01)
*G06F 3/04845* (2022.01)

(56) References Cited

U.S. PATENT DOCUMENTS

| | | | |
|---|---|---|---|
| 9,019,265 B2 | 4/2015 | Yonezu | |
| 2011/0211256 A1 | 9/2011 | Connor | |
| 2013/0120360 A1* | 5/2013 | Hsu | H04N 13/128 |
| | | | 345/419 |
| 2013/0127826 A1* | 5/2013 | Walton | G06T 19/20 |
| | | | 345/419 |
| 2014/0169764 A1* | 6/2014 | Behan | H04N 9/87 |
| | | | 386/278 |
| 2015/0130894 A1* | 5/2015 | Holzer | G06F 16/738 |
| | | | 348/36 |
| 2015/0341616 A1* | 11/2015 | Siegel | H04N 13/261 |
| | | | 348/54 |
| 2016/0370956 A1* | 12/2016 | Penha | H04N 21/4312 |

* cited by examiner

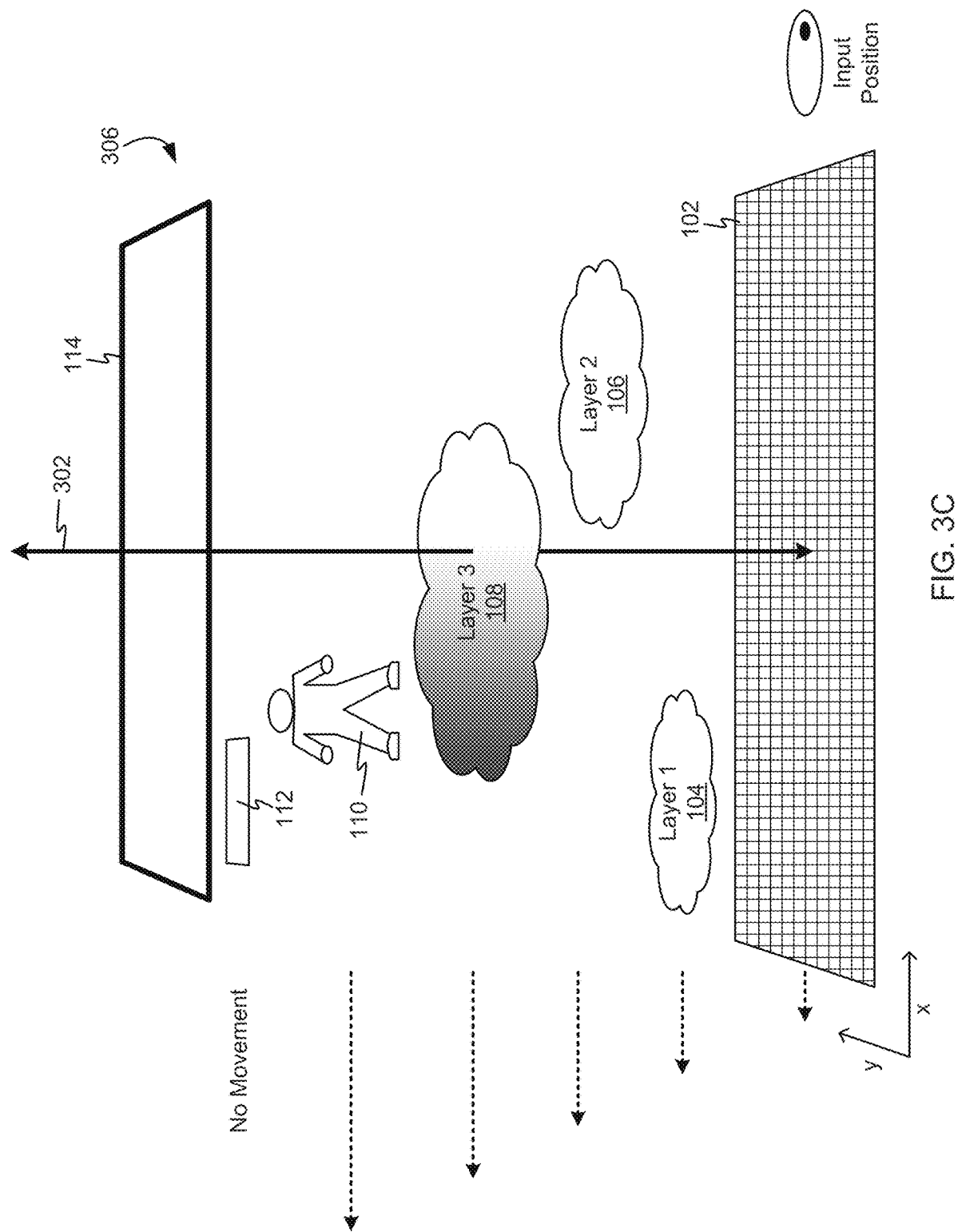

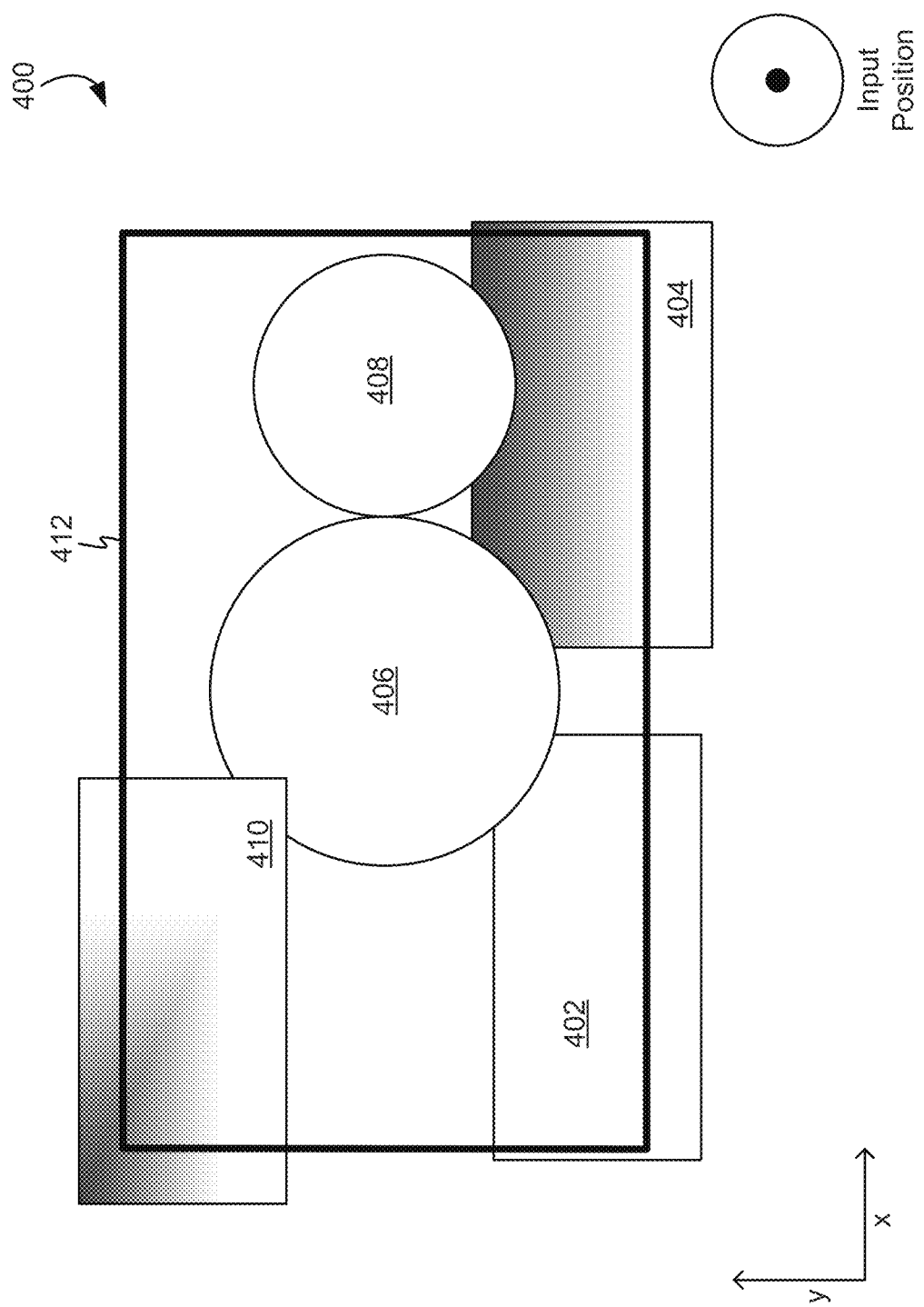

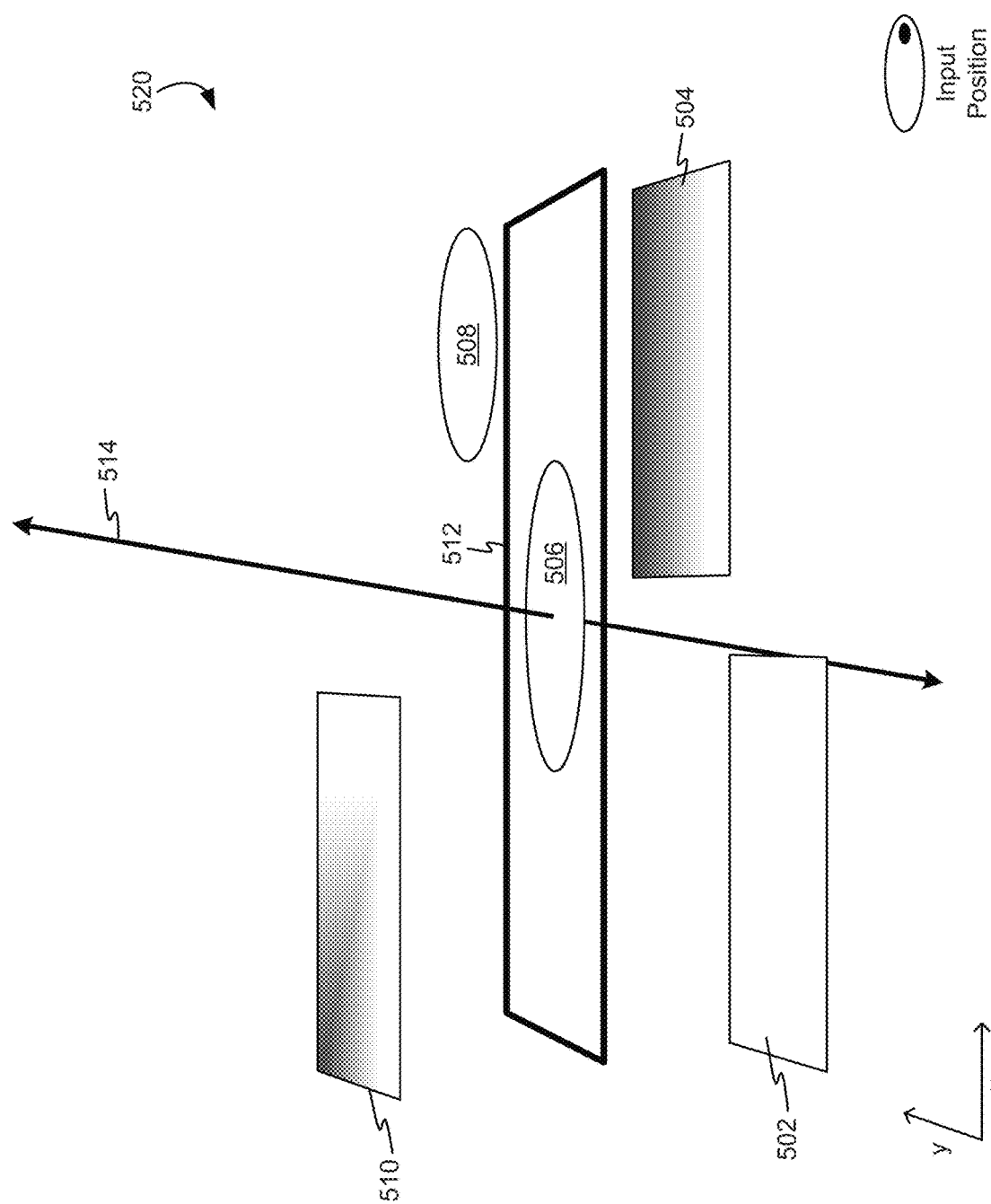

STACKED MEDIA ELEMENTS WITH SELECTIVE PARALLAX EFFECTS

INCORPORATION BY REFERENCE

The following application is hereby incorporated by reference: application no. 62/822,913 filed on Mar. 24, 2019. The Applicant hereby rescinds any disclaimer of claim scope in the parent application or the prosecution history thereof and advises the USPTO that the claims in this application may be broader than any claim in the parent application.

TECHNICAL FIELD

The disclosure generally relates to displaying visual media elements, and more particularly to displaying stacked media elements that implement selective parallax effects.

BACKGROUND

Visual media elements, such as images and videos, are used to market and promote media compositions, such as movies, films, and television shows. However, these visual media elements do not allow for user interaction or variance once they are composed, and therefore do not provide a thoroughly engaging viewing experience to promote such media compositions.

SUMMARY

In some implementations, a method includes obtaining a media composition for display on an electronic display device is obtained. The media composition includes a plurality of layers, with each layer including at least one visual element. The method also includes selecting at least some of the layers of the media composition to have a parallax effect applied thereto and determining an amount of total parallax effect to apply to the selected layers. Also, the method includes determining an appropriate amount of offset to apply to each of the selected layers on an individual basis and shifting the selected layers in one or more directions by their respective appropriate amounts of offset. Moreover, the method includes displaying the media composition showing the parallax effect on the electronic display device.

Particular implementations provide at least the following advantages. A media composition may include visual elements which are selectively included for having a parallax effect applied thereto. The visual elements may be text, images, animations, videos, or any other type of visual element. Moreover, videos may have transparency added thereto, to allow lower layers to be seen through portions of the videos that are not desired to be opaque, thereby allowing for a more immersive experience for viewers of the media composition once the parallax effect is applied to layers thereof.

Details of one or more implementations are set forth in the accompanying drawings and the description below. Other features, aspects, and potential advantages will be apparent from the description and drawings, and from the claims.

DESCRIPTION OF DRAWINGS

FIGS. 3A-3C show a side view of a parallax effect applied to a set of stacked visual elements, in an example.

FIGS. 4A-4E show a parallax effect applied to a set of stacked visual elements, in an example.

FIGS. 5A-5E show a parallax effect applied to a set of stacked visual elements, in another example.

Like reference symbols in the various drawings indicate like elements.

DETAILED DESCRIPTION

Figure 1A:
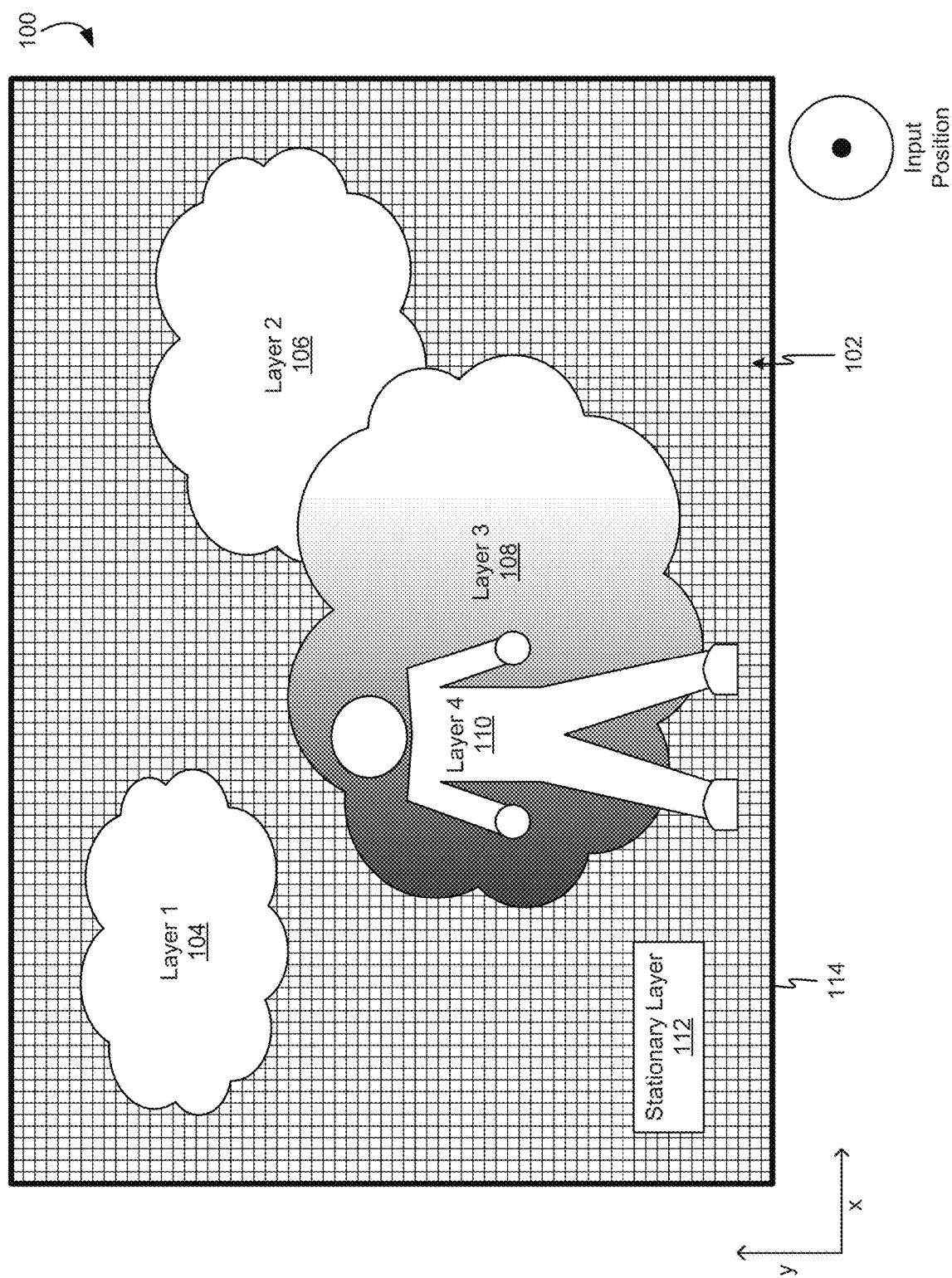
FIGS. 1A-1E show a top-down view of a parallax effect applied to a set of stacked visual elements of a media composition, in one example.

A visual element, as used herein, describes a media object that is capable of being displayed within a media composition on a two-dimensional electronic display device. A visual element may include a video, a static image, a series of images that form a single animated image, in several examples, or any other visual property, component, module, and/or portion that may be displayed in a media composition as would be known to one of skill in the art. A media composition may have any format capable of providing data needed to display a set of visual elements, such as a widget, a video file, another proprietary format, etc. A media composition includes more than one visual element, such as a video and a static image, two static images and an animated image, multiple videos with a static banner, etc., and may have any size, purpose, length of running time, or other property provided by the format chosen to store the media composition.

A parallax effect may be described as a displacement or shift in viewed objects that changes depending on an angle of viewing the objects. In other words, the parallax effect, which makes it appear to a viewer that objects have moved, is caused by viewing the objects along different sight lines.

Although it may be desirable to impute a parallax effect to objects displayed on an electronic display device, such as a computer monitor, a television set, etc., such electronic display devices do not have the capability to allow two-dimensionally displayed objects to be viewed from multiple angles. Instead, these electronic display devices present objects in a two-dimensional media composition from one angle regardless of how the user views the electronic display device. The viewing angle is determined by the designer of the media composition and does not change. Consequently, a parallax effect may be provided to a media composition using another technique that does not rely on changing a viewing angle of the user, according to various embodiments described herein.

In the present descriptions, the parallax effect for a media composition is achieved by shifting (e.g., offsetting) one or more visual elements from a set of visual elements within the media composition in one or more lateral directions normal to the two-dimensional plane on which the visual elements are displayed in the media composition. In certain approaches, the shifting is applied to visual elements progressively to a selected subset of the elements within the media composition.

Adding a Parallax Effect

FIGS. 1A-1E show a parallax effect applied to a set of stacked visual elements in a media composition, in one example. Now referring to FIG. 1A, a top-down view of a media composition is shown in a first configuration 100 with a neutral input position (indicated as a black circle centered within the white circle). The media composition comprises a set of stacked visual elements that together provide the basis for the media composition. The extent of the media composition (total area displayed) is set by a frame 114 that determines the viewable area of the media composition (the viewable area is determined by a width and a height of the frame 114 in one approach). The frame 114 is shown as a rectangular shape, but may have any two-dimensional shape as chosen by a designer of the media composition, such as circular, elliptical, triangular, pentagonal, hexagonal, etc. Moreover, the size and shape of the frame 114 may be chosen to integrate into a graphical user interface (GUI).

Each of the visual elements is comprised in an individual layer that are stacked within the media composition, such that the media composition comprises a plurality of layers, each layer comprising a visual element. In the present descriptions, layer and visual element may be used interchangeably to describe the objects in the media composition. In the example of FIG. 1A, the set of visual elements include, in order of the stack, a background layer 102, layer 1 104, layer 2 106, layer 3 108, layer 4 110, and a stationary layer 112.

The frame 114, x-y axis, and input position indicator are for descriptive purposes only, and are not reproduced in the media composition in one approach. In another approach, the frame 114 may be visible to indicate a border around the media composition.

The background layer 102 is the lowest layer in the media composition, and in FIGS. 1A-1E, is shown as a static image (cross-hatched in this example), but may be a video, a set of images that form an animated image, or some other type of visual element known in the art. As shown, the background layer 102 is deselected from having the parallax effect applied, such as by a designer of the media composition, thereby rendering the background layer 102 static or stationary. In other words, the background layer 102 is not effected by the parallax effect. However, in other configurations, the background layer 102 may be selected to have the parallax effect applied thereto, as shown in FIGS. 2A-2B.

Referring again to FIGS. 1A-1E, layer 1 104 is positioned above the background layer 102 in the media composition, and is shown as a small cloud image located in the upper left portion of the media composition. The small cloud is a single image that has been selected to have the parallax effect applied, and therefore will shift position within the frame 114 in response to the input position, in this example.

Layer 2 106 is positioned above the background layer 102 and offset from layer 1 104. Layer 2 106 is shown as a medium cloud image located in the upper right portion of the media composition. The medium cloud is a single image that has been selected to have the parallax effect applied, and therefore will shift position within the frame 114 in response to the input position, in this example.

Layer 3 108 is positioned above the background layer 102 and layer 2 106, offset from layer 1 104. Layer 3 108 is shown as a large cloud located in the lower center portion of the media composition. The large cloud is a video (that plays for its entire length once the media composition is activated) that has been selected to have the parallax effect applied, and therefore will shift position within the frame 114 in response to the input position, in this example. As can be seen, the video is confined within the bounds of the cloud edges, and between the ridges of the cloud, layer(s) positioned below are visible. Moreover, the video will play over time, as demonstrated by the changing of the shaded regions of the large cloud when viewed across the different configurations shown in FIGS. 1A-1E. This is intended to demonstrate that the parallax effect may be applied even while videos and animation are active and playing in the media composition.

Layer 4 110 is positioned above the background layer 102 and layer 3 108, and offset from layer 1 104 and layer 2 106. Layer 4 110 is shown as a person located in the left lower center portion of the media composition. The person is a single image that has been selected to have the parallax effect applied, and therefore will shift position within the frame 114 in response to the input position, in this example.

The stationary layer 112 is positioned above the background layer 102 in the lower left portion of the media composition. Stationary layer 112 is shown as a static image of a rectangle which has been deselected from having the parallax effect applied, such as by the designer. The stationary layer 112 will not shift position within the frame 114 in response to the input position, in this example, thereby rendering the stationary layer 112 static or motionless.

As shown, the background layer 102 is selected to be static by a designer of the media composition, and is not effected by the parallax effect. However, in other configurations, the background layer 102 may also have the parallax effect applied thereto, as shown in FIGS. 2A-2B. Moreover, in FIGS. 1A-1E, the background layer 102 is shown as being a same size as the frame 114, but is not so restricted, and may instead have any size and shape as desired by the designer. Should the background layer 102 have transparent portions, then a display default will be shown behind the transparent portions of the background layer 102 when not covered by other upper layers.

The input position, in one approach, may be used to indicate the amount of parallax effect to apply to the media composition. When the input position is neutral (centered in the circle), the media composition is displayed in its unaltered form (e.g., with no parallax effect applied). In response to the input position moving to the left of the circle (as in FIG. 1B), to the right of the circle (as in FIG. 1C), to the top of the circle (as in FIG. 1D), and to the bottom of the circle (as in FIG. 1E), different parallax effects may be applied to the media composition.

In another approach, the parallax effect may be applied to the media composition in one or more directions in response to a trigger or condition being satisfied with or without user input. Any trigger may be used to cause the parallax effect to be applied, such as, for example, an application launching on a computing system, a user selecting the media composition or some other portion of a graphical user interface (GUI) on the display, a time period elapsing, a time of day being achieved, periodically, etc. Any user input device and input type may be used for selecting with the GUI, such as selection with a mouse, hover over a portion of the GUI using a mouse, selection or hover with a trackpad, selection or hover in response to a user's eye gaze as detected using an eye tracking device, an accelerometer or other movement sensor denoting movement of a computing device, light sensor denoting changes to an environment in which a computing device is placed, or other input device and method of detecting input known in the art.

In an example, a trigger may comprise moving a ribbon of a GUI that displays one or more media compositions, and while the ribbon is moved, the parallax effect may be applied to selected visual elements of the one or more media compositions. This example does not need user interaction with any specific media composition. Instead, this trigger relies on interaction with a secondary GUI that is displaying the one or more media compositions.

Any layer in the media composition may include animation and/or video content with a predetermined length. In one approach, once the animation and/or video has finished playing in its entirety, the animation and/or video may stop. In a further approach, a default static image may be displayed that occupies the same area in the media composition as the animation and/or video. This default static image may be selected by a designer or set automatically as the first frame of the animation and/or video. In another approach, once the animation and/or video has finished playing in its entirety, the animation and/or video may be restarted automatically at a beginning thereof and play endlessly or for a predetermined number of cycles. According to a further approach, the animation and/or video may be designed to start and end with the same or substantially similar images, thereby giving an effect of playing endlessly without any break or end (referred to as "looped play").

The total amount of parallax effect that is applied to the media composition may be predetermined, or may be based on some parameters of the media composition, such as size of the frame 114 in relation to a total canvas size, a size of individual layers within the media composition, etc.

Figure 1B:
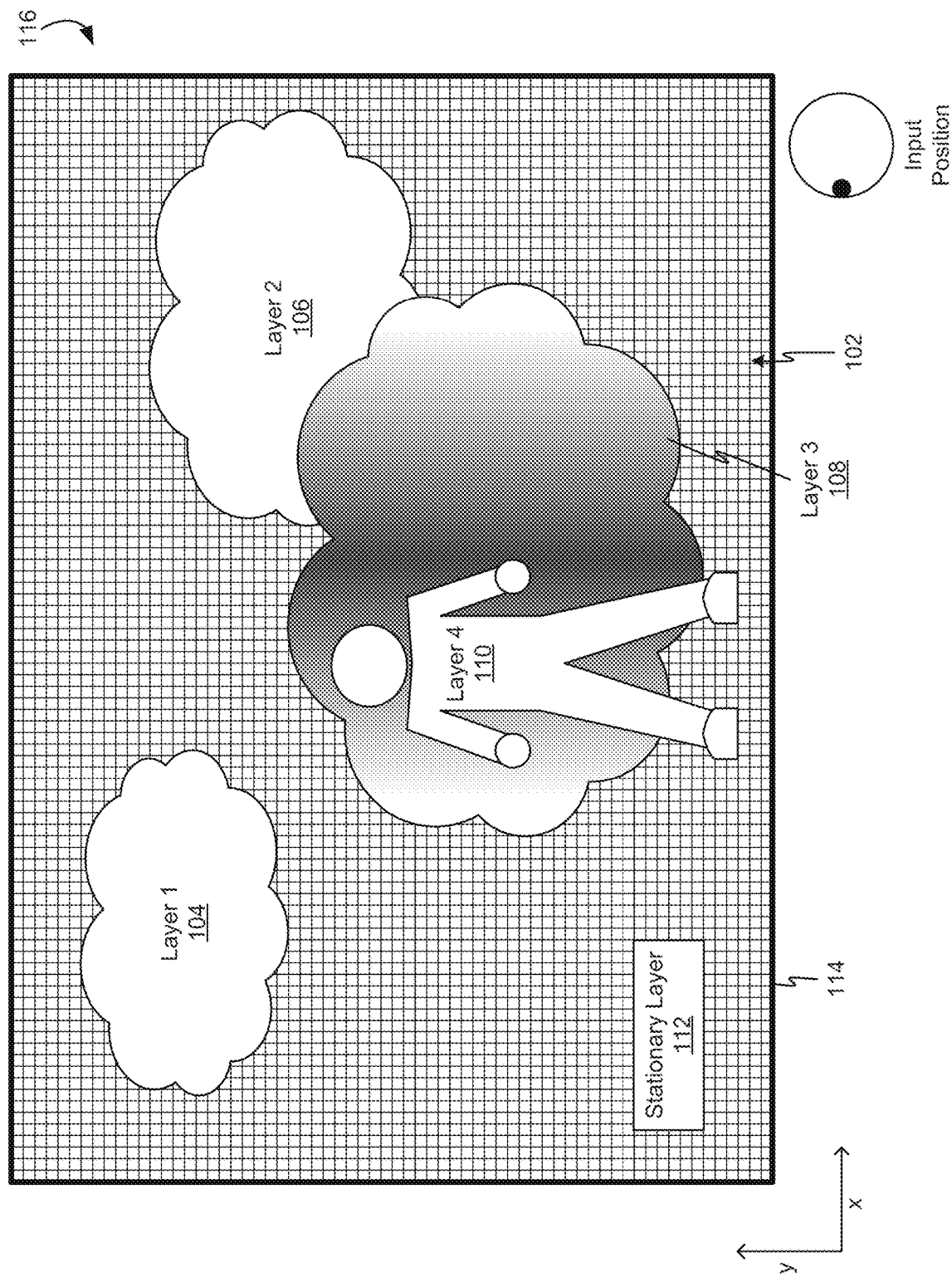
Figure 2A:
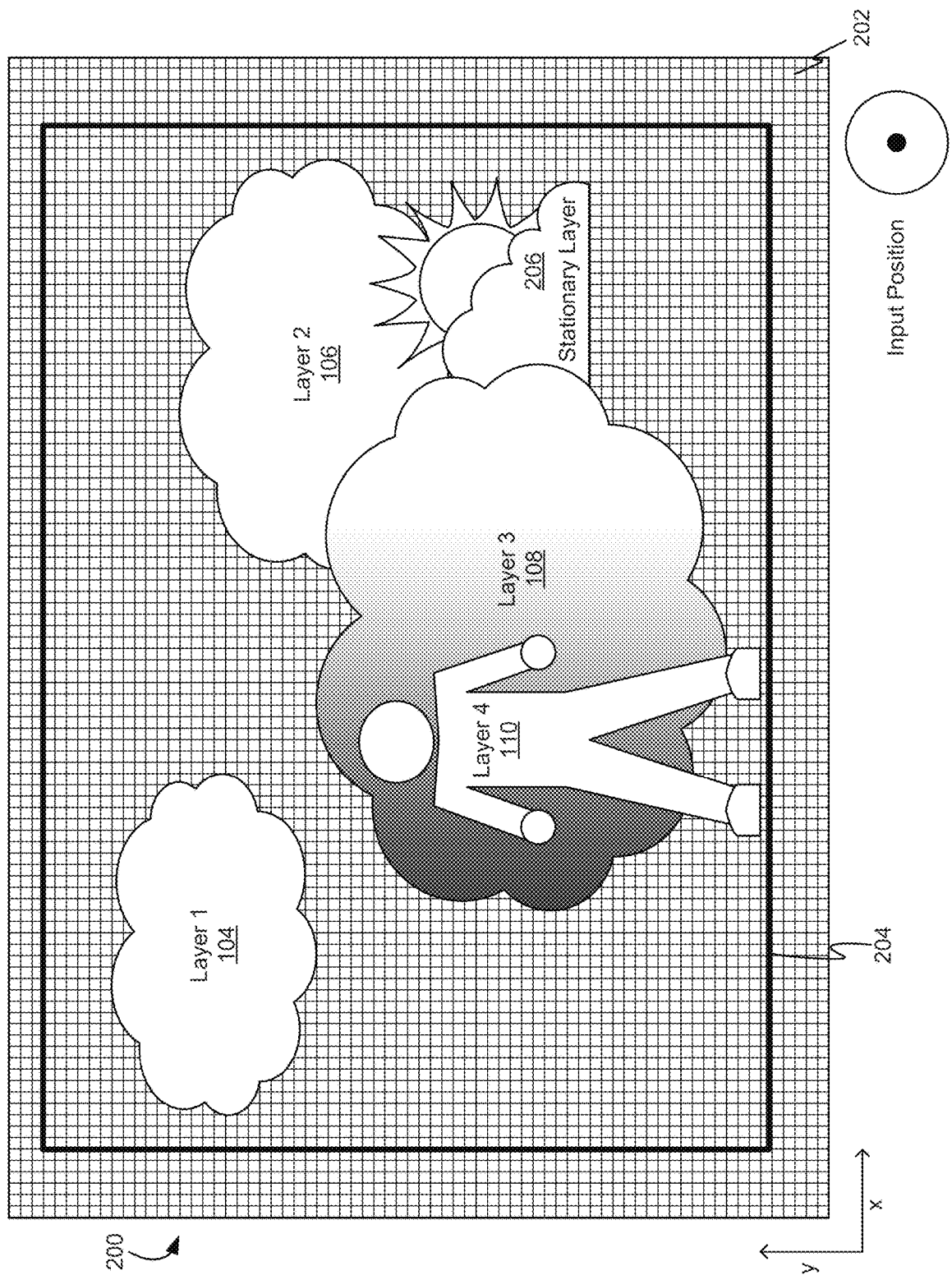
FIGS. 2A-2B show a top-down view of a parallax effect applied to another set of stacked visual elements, in one example.
Figure 2B:
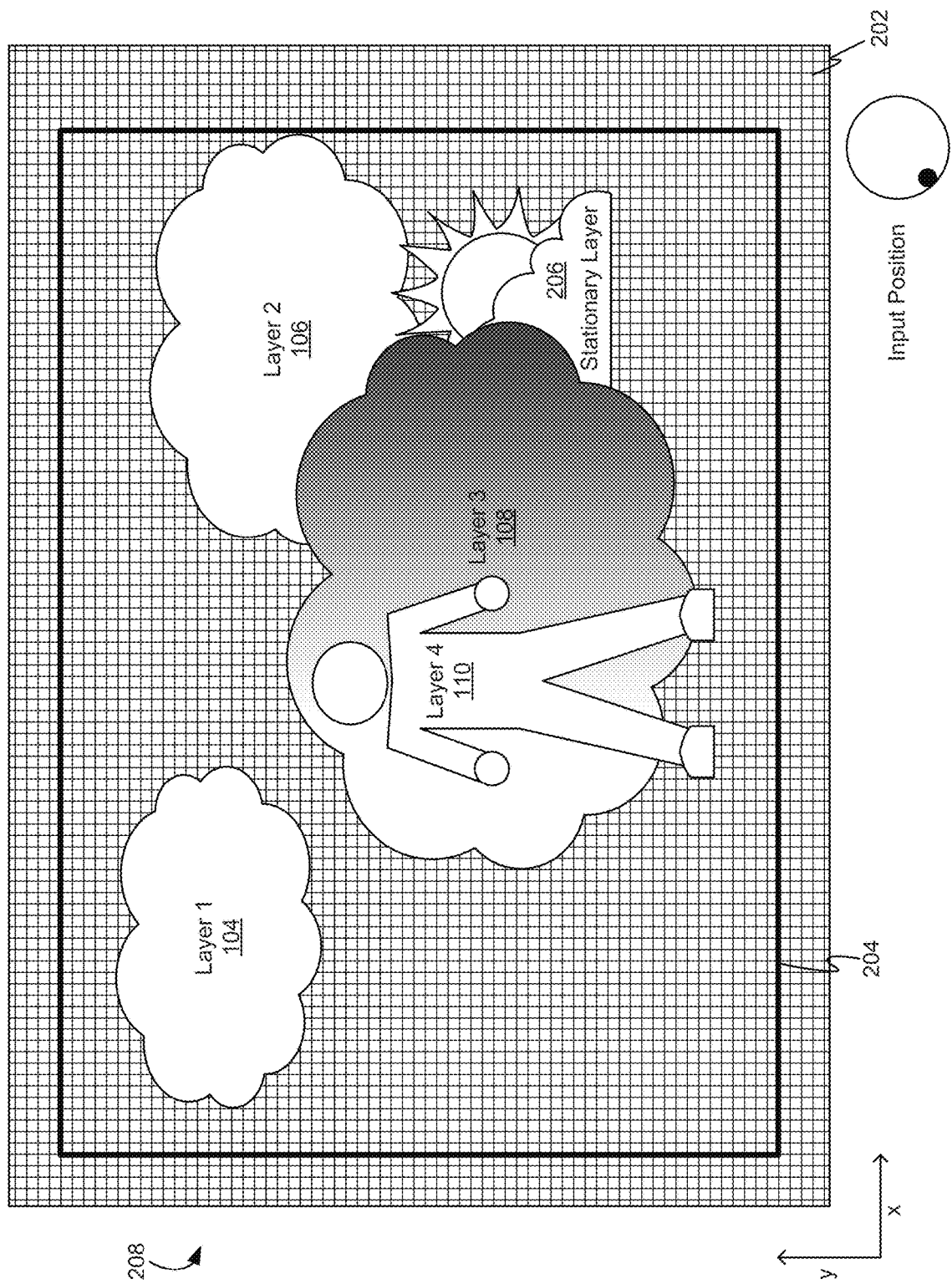

Now referring to FIG. 1B, a top-down view of the media composition is shown in a second configuration 116 with a left input position (indicated as the black circle on the left side of the white circle). As shown, each of the layers which have parallax effects selected (layer 1 104, layer 2 106, layer 3 108, and layer 4 110, herein the "parallax layers") have shifted to the right, while the layers which have parallax effects deselected (background layer 102 and stationary layer 112) remain in their original positions from FIG. 1A.

The amount of offset (e.g., shift) applied for the different parallax layers may be vary from one layer to the next, and may be based on an amount of directional input (e.g., whether the input position is completely left to the edge of the circle, or partially left with more room to push to the left before reaching the edge of the circle). In FIG. 1B, it is shown that layer 1 104 shifts the least amount while layer 4 110 shifts the greatest amount. This is in accordance with one embodiment, where the amount of parallax effect (shift) applied to each individual layer is determined based on a position of the layer within the stack of visual elements that comprise the media composition. Because layer 1 104 is closest to the bottom of the stack (and is selected to have parallax effects applied thereto unlike background layer 102), it receives the least amount of offset to reproduce the effect of a distant object in a field of view. If background layer 102 is not a stationary layer, then it would shift the least amount in FIG. 1B. In contrast, layer 4 110 is farthest from the bottom of the stack, and therefore it receives the greatest amount of offset to reproduce the effect of a close object in the field of view.

In one approach, the amount of offset applied to the parallax layers is evenly distributed across the number of parallax layers. In FIGS. 1A-1E, there are four parallax layers, so each progressive parallax layer receives an additional 25% of the total parallax effect (25% shift for layer 1 104, 50% shift for layer 2 106, 75% shift for layer 3 108, 100% shift for layer 4 110). If there were ten parallax layers, then each progressive parallax layer would receive an additional 10% of the total parallax effect (10% for first layer, 20% for second layer, . . . , 90% for ninth layer, 100% for tenth layer). Any other method of even distribution for the parallax effect may be used in the embodiments described herein as would be understood by one of skill in the art.

In another approach, the amount of offset applied to the parallax layers may be distributed across the number of parallax layers according to an algorithm or equation. According to one example algorithm, the amount of parallax effect applied to each layer may be determined based on an equation that progressively increases a fractional percentage, such as ($\frac{1}{10}$) 10% shift for layer 1 104, ($\frac{1}{10}+\frac{2}{10}$) 30% shift for layer 2 106, ($\frac{1}{10}+\frac{2}{10}+\frac{4}{10}$) 70% shift for layer 3 108, 100% shift for layer 4 110. In another example, the distribution of the shift may be inverted, such that layer 4 110 receives the least amount of offset and layer 1 104 receives the greatest amount of offset.

According to another embodiment, the amount of offset applied to each of the parallax layers may be set by the designer of the media composition, with the amount of effect being related to or unrelated with the stack order. For example, layer 3 108 may have 80% shift applied, layer 1 104 may have 60% shift applied, while all other parallax layers have only 20% shift applied. Moreover, there is no requirement that all 100% of the available parallax effect is ever applied to any of the layers, in approaches described herein.

Figure 1C:
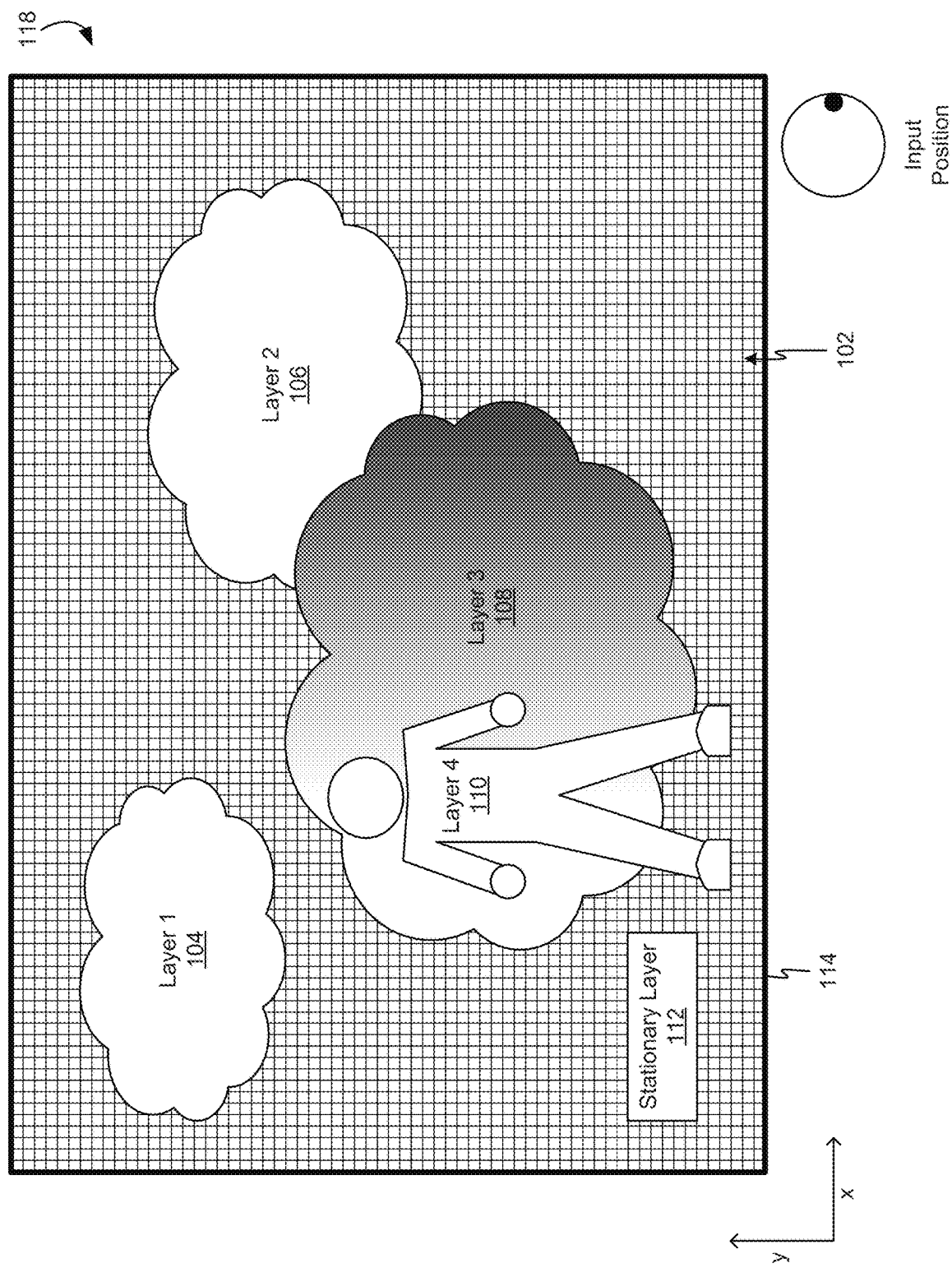

Now referring to FIG. 1C, a top-down view of the media composition is shown in a third configuration 118 with a right input position (indicated as the black circle on the right side of the white circle). As shown, each of the parallax layers have shifted to the left, while the layers which have parallax effects deselected (background layer 102 and stationary layer 112) remain in their original positions from FIG. 1A.

In FIG. 1C, it is shown that layer 1 104 shifts the least amount while layer 4 110 shifts the greatest amount. This is in accordance with one embodiment, where the amount of offset applied to each individual layer is determined based on a position of the layer within the stack of visual elements that comprise the media composition.

Figure 1D:
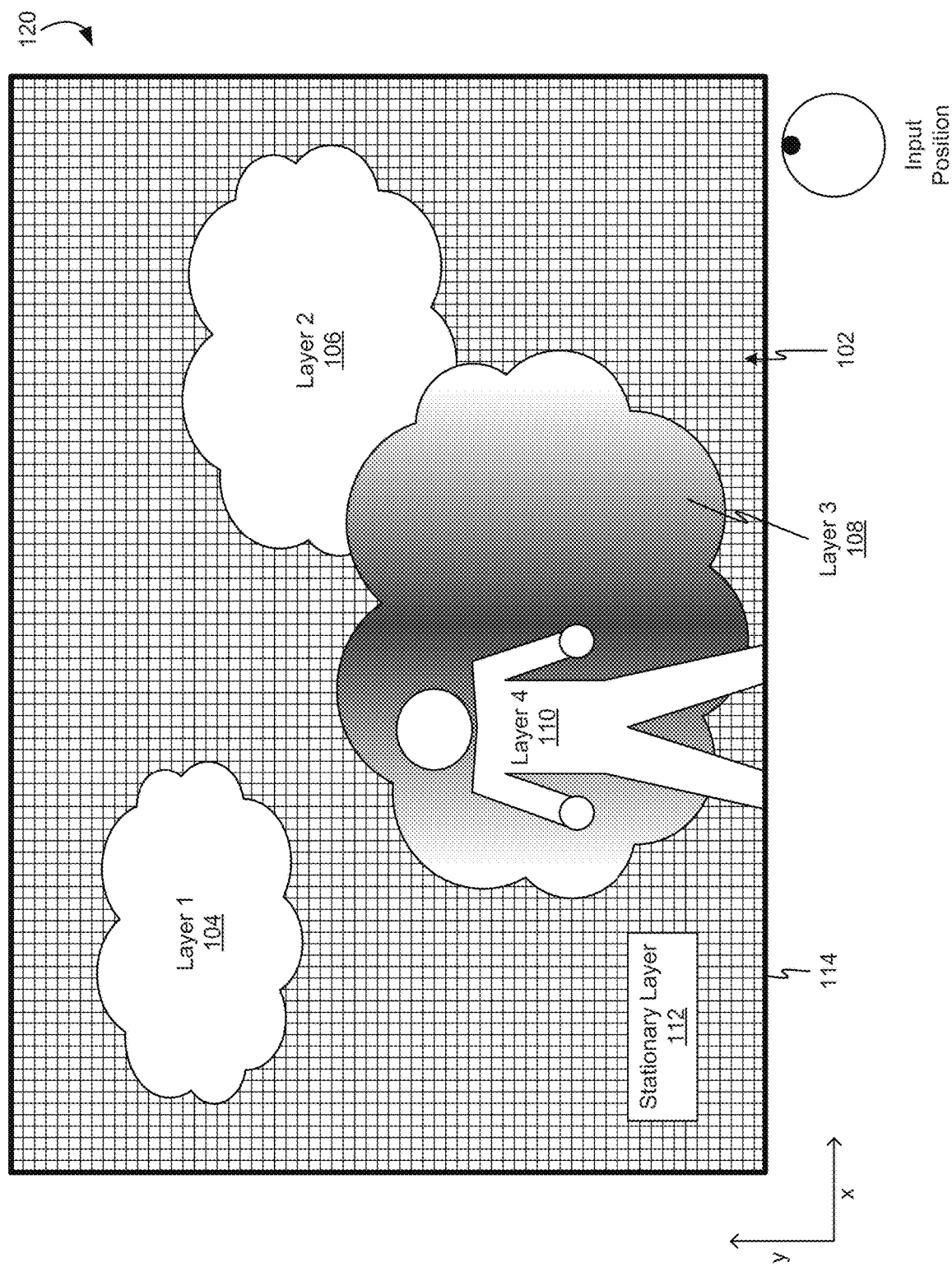

Now referring to FIG. 1D, a top-down view of the media composition is shown in a fourth configuration 120 with a top input position (indicated as the black circle on the top of the white circle). As shown, each of the parallax layers have shifted to the bottom, while the layers which have parallax effects deselected (background layer 102 and stationary layer 112) remain in their original positions from FIG. 1A.

In FIG. 1D, it is shown that layer 1 104 shifts the least amount while layer 4 110 shifts the greatest amount. This is in accordance with one embodiment, where the amount of offset applied to each individual layer is determined based on a position of the layer within the stack of visual elements that comprise the media composition.

Figure 1E:
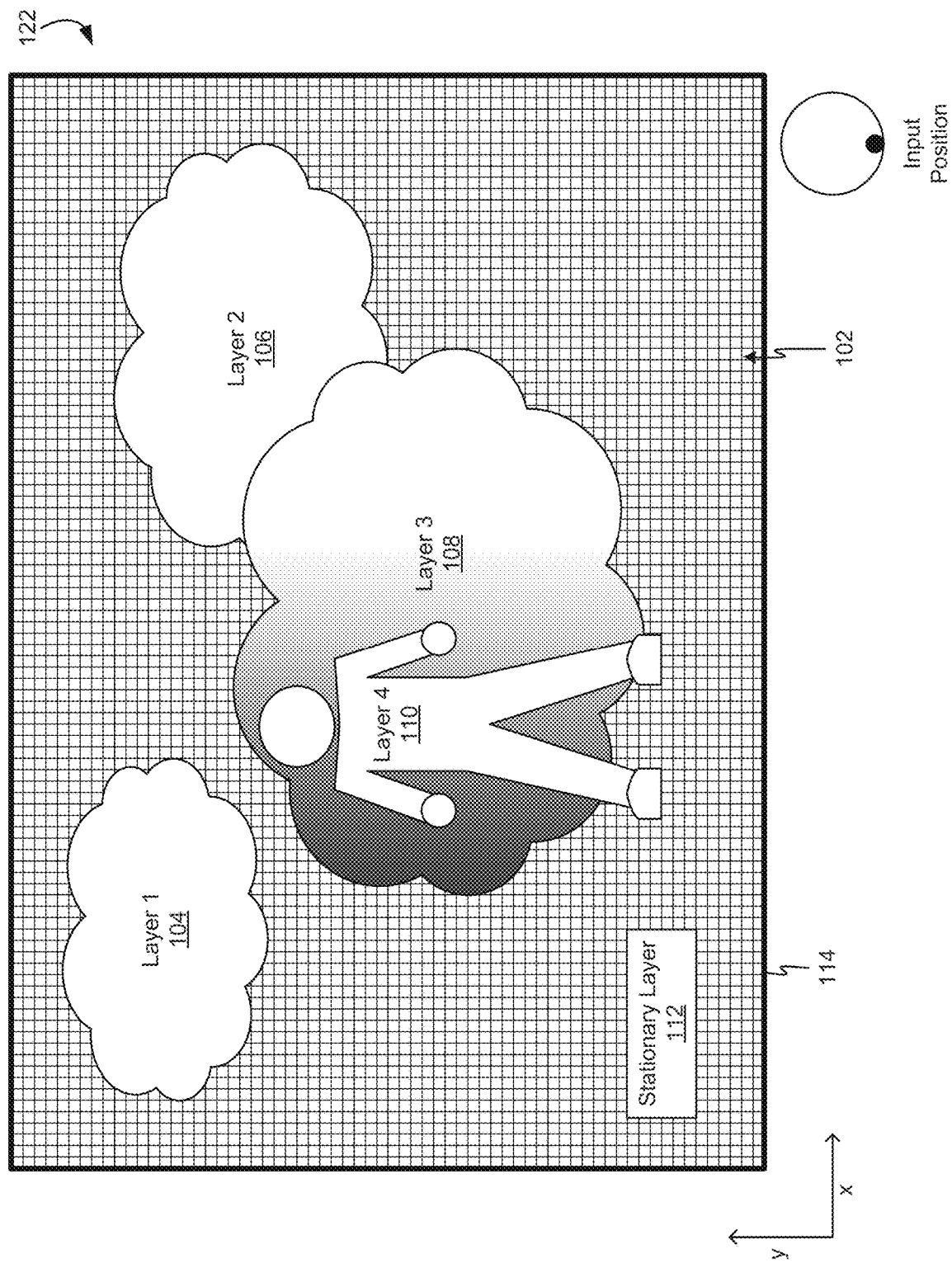

Now referring to FIG. 1E, a top-down view of the media composition is shown in a fifth configuration 122 with a bottom input position (indicated as the black circle on the bottom of the white circle). As shown, each of the parallax layers have shifted to the top, while the layers which have parallax effects deselected (background layer 102 and stationary layer 112) remain in their original positions from FIG. 1A.

In FIG. 1E, it is shown that layer 1 104 shifts the least amount while layer 4 110 shifts the greatest amount. This is in accordance with one embodiment, where the amount of offset applied to each individual layer is determined based on a position of the layer within the stack of visual elements that comprise the media composition.

FIGS. 2A-2B show a parallax effect applied to a set of stacked visual elements in a media composition, in one example. Now referring to FIG. 2A, a top-down view of a media composition is shown in a configuration 200 with a neutral input position. The media composition comprises a set of stacked visual elements that together provide the basis for the media composition. The extent of the media composition (total area displayed) is set by the frame 204 that determines the viewable area of the media composition. In the example of FIG. 2A, the set of visual elements include, in order of the stack, a background layer 202, layer 1 104, layer 2 106, stationary layer 206, layer 3 108, and layer 4 110.

The background layer 202 is the lowest layer in the media composition, and in FIGS. 2A-2B, is shown as an image (cross-hatched in this example) that is larger than the frame 204, but may be a video, a set of images that form an animated image, or some other type of visual element known in the art. As shown, the background layer 202 is selected to have the parallax effect applied, such as by the designer of the media composition, and therefore will shift position within the frame 204 in response to the input position, in this example. Moreover, portions of the background layer 202 are not visible due to the size being larger than the frame 204 (the portions of the background layer 202 around the edges that extend beyond the frame 204. However, as the parallax effect is applied to the media composition, some or all of these portions may be visible at different times as the input position is moved.

Layer 1 104 is positioned above the background layer 202 in the media composition, and is shown as a small cloud image located in the upper left portion of the media composition. The small cloud is a single image that has been selected to have the parallax effect applied, and therefore will shift position within the frame 204 in response to the input position, in this example.

Layer 2 106 is positioned above the background layer 202 and offset from layer 1 104. Layer 2 106 is shown as a medium cloud image located in the upper right portion of the media composition. The medium cloud is a single image that has been selected to have the parallax effect applied, and therefore will shift position within the frame 204 in response to the input position, in this example.

The stationary layer 206 is positioned above the background layer 202 in the middle right portion of the media composition. Stationary layer 206 is shown as a static image of a sun partially hidden behind a small cloud. The stationary layer 206, in this example, has been deselected from having the parallax effect applied, such as by the designer. Therefore, in this example, the stationary layer 206 will not shift position within the frame 204 in response to the input position, thereby rendering the stationary layer 206 static or motionless. Moreover, the positioning of this stationary layer 206 demonstrates that the parallax effect may be applied to layers above and/or below any stationary layer in a media composition, and the parallax layers will shift above and below the stationary layer 206 in response to the input position.

Layer 3 108 is positioned above the background layer 102, layer 2 106, and the stationary layer 206, and is offset from layer 1 104. Layer 3 108 is shown as a large cloud located in the lower center portion of the media composition. The large cloud is a video (that plays for its entire length once the media composition is activated). Layer 3 108, in this example, has been selected to have the parallax effect applied, and therefore will shift position within the frame 204 in response to the input position. As can be seen, the video is confined within the bounds of the cloud edges, and between the ridges of the cloud, layer(s) positioned below (e.g., layer 2 106 and stationary layer 206) are visible. Moreover, the video will play over time, as demonstrated by the changing of the shaded regions of the large cloud when viewed across the different configurations shown in FIGS. 2A-2B. This is intended to demonstrate that the parallax effect may be applied to the media composition while videos and animation are active and playing.

Layer 4 110 is positioned above the background layer 102 and layer 3 108, and offset from layer 1 104, layer 2 106, and stationary layer 206. Layer 4 110 is shown as a person located in the left lower center portion of the media composition. The person is a single image that has been selected to have the parallax effect applied, and therefore will shift position within the frame 204 in response to the input position, in this example.

Now referring to FIG. 2B, a top-down view of the media composition is shown in another configuration 208 with a down-left input position. As shown, each of the layers which have parallax effects selected (background layer 202, layer 1 104, layer 2 106, layer 3 108, and layer 4 110, herein the "parallax layers") have shifted to the right and up, while the layer which has parallax effects deselected (stationary layer 206) remains in its original positions from FIG. 2A.

The amount of offset applied for the different parallax layers may be vary from one layer to the next, and may be based on an amount of directional input (e.g., whether the input position is completely left to the edge of the circle, or partially left with more room to push to the left before reaching the edge of the circle). In FIG. 2B, it is shown that background layer 202 shifts the least amount while layer 4 110 shifts the greatest amount. This is in accordance with one embodiment, where the amount of parallax effect applied to each individual layer is determined based on a position of the layer within the stack of visual elements that comprise the media composition. Because background layer 202 is closest to the bottom of the stack, it receives the least amount of offset to reproduce the effect of a distant object in a field of view. In contrast, layer 4 110 is farthest from the bottom of the stack and closest to an imaginary viewer of the stack, and therefore it receives the greatest amount of offset to reproduce the effect of a close object in the field of view.

In one approach, the amount of offset applied to the parallax layers is evenly distributed across the number of parallax layers. In another approach, the amount of offset applied to the parallax layers is distributed across the number of parallax layers according to an algorithm or equation. According to another embodiment, the amount of offset applied to each of the parallax layers may be set by the designer of the media composition, with the amount of effect not being restricted to being implemented in accordance with the stack order. For example, background 202 may have 100% parallax effect, while all other parallax layers have only 20% shift applied.

As can be seen in FIG. 2B, as layer 3 108 shifts, it obscures more of the stationary layer 206 than in FIG. 2A. Also, as shown in FIG. 2B, as layer 2 106 shifts, background layer 202 is exposed between the rays of the sun of the stationary layer 206. In other words, the space between the rays of the sun in the stationary layer 206 is transparent, and reveals anything that is positioned below. This is true whether the layer is an image, an animated image, a video, or any other type of visual content.

Figure 3A:
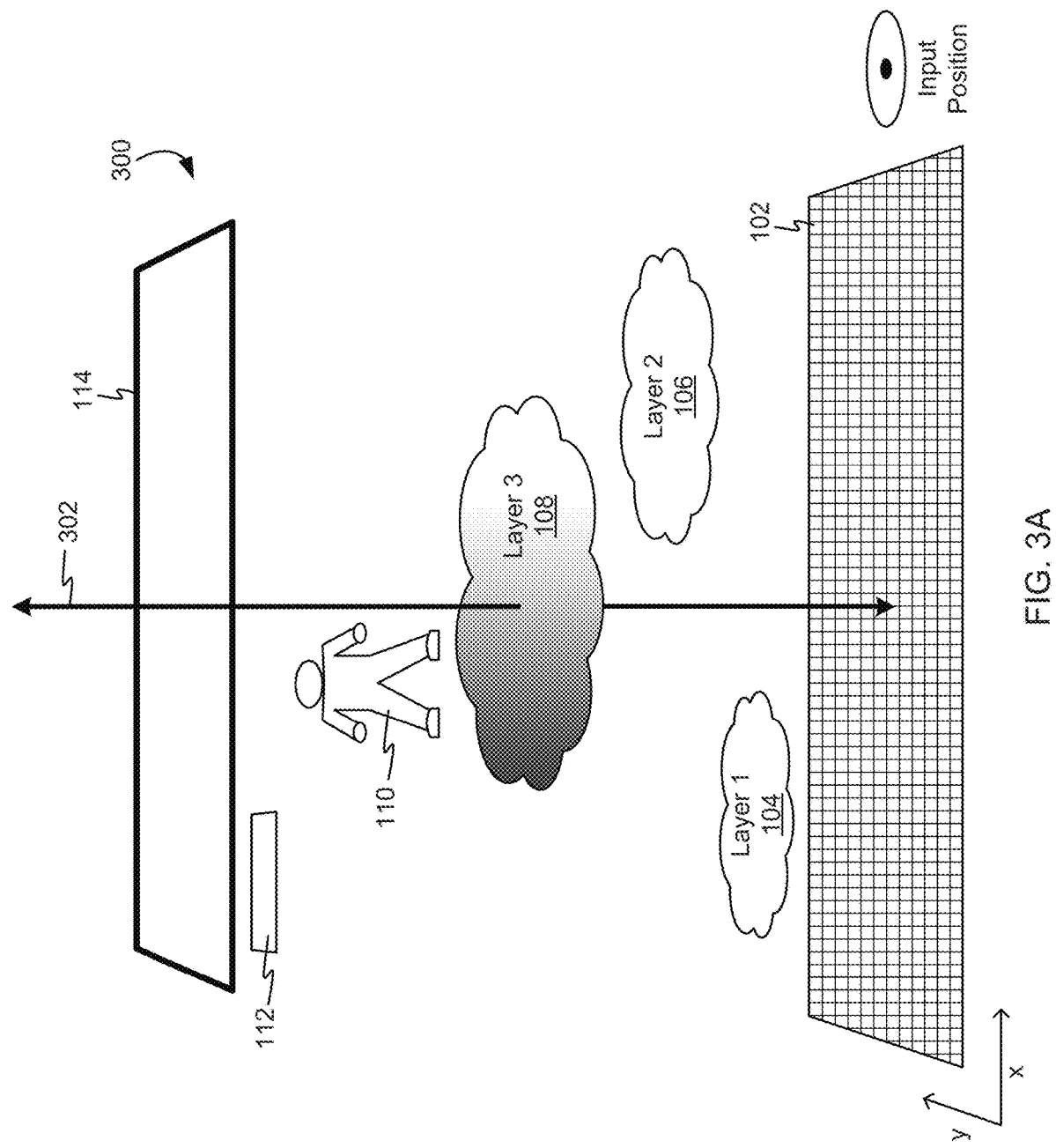
Figure 3B:
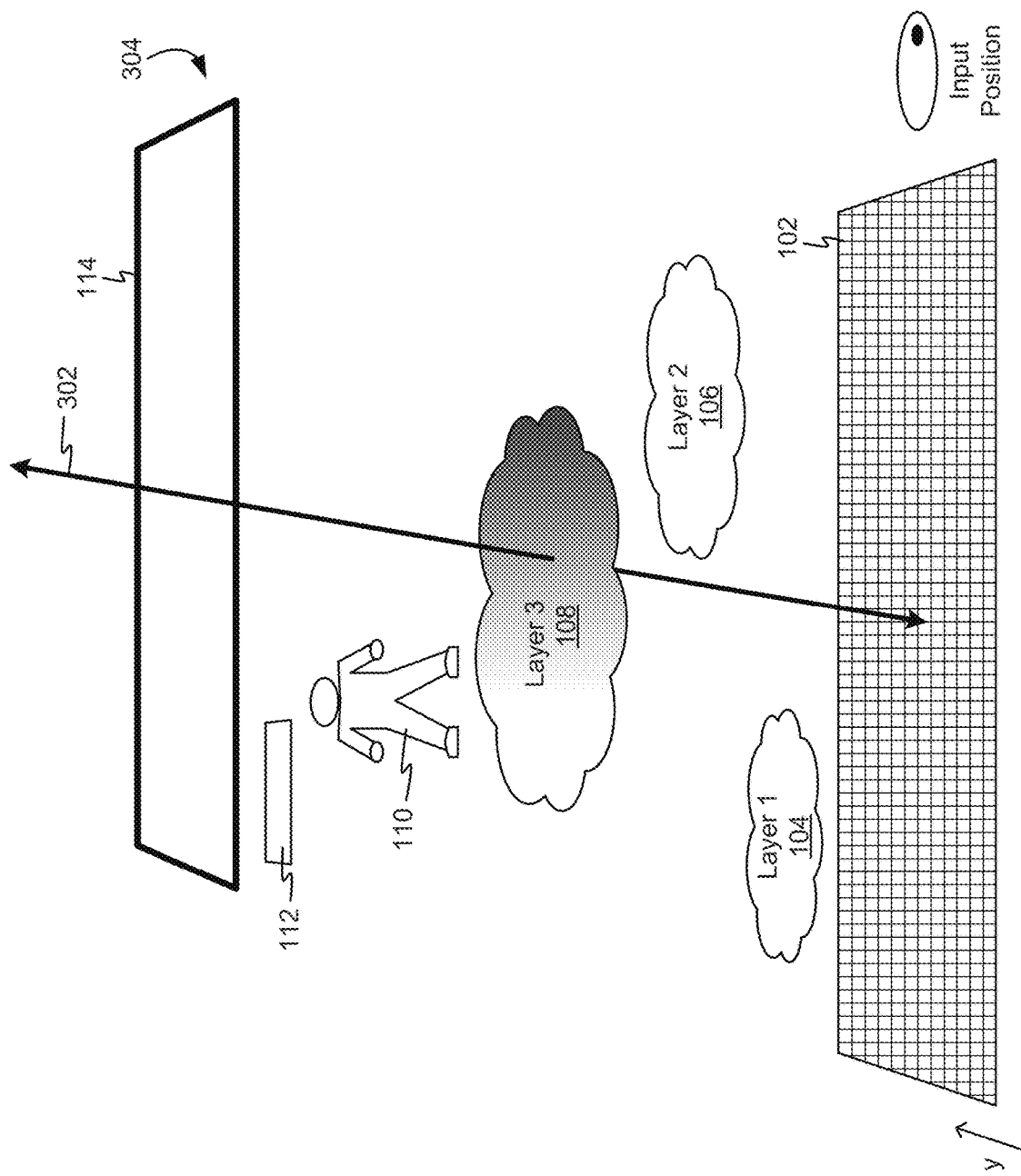

Now referring to FIGS. 3A-3C, a side view of a parallax effect being applied to a set of stacked visual elements is shown in an example. The x-y plane is shown laid out with the x-axis still being in the width direction, and the y-axis extending into the page with a small amount of perspective added to the layers for clarity. Also, the separation between the layers is exaggerated to aid in understanding how the parallax effect works on a layer-by-layer basis.

As shown, the background layer 102, layer 1 104, layer 2 106, layer 3 108, and layer 4 110 are selected to have the parallax effect applied thereto (referred to as the "parallax layers" in the description of FIGS. 3A-3C), while the stationary layer 112 is deselected from having the parallax effect applied thereto. Of course, which layers are selected for parallax effect and which layers are deselected is a choice for the designer or user of the media composition, and any layer in the media composition may have parallax selectively applied thereto in various configurations.

A viewline 302 is positioned normal to the x-y plane in configuration 300 shown in FIG. 3A, and intersects the frame 114 at a center point thereof in both the x-direction and the y-direction. The viewline 302 is used to denote a logical viewing angle for the media composition and how this logical viewing angle moves and tilts in response to changes in the input position, which will be simulated by the parallax effect applied after receiving the input position changes.

Now referring to FIG. 3B, a configuration 304 is shown with the viewline 302 tilting to the right in response to an input position directed to the right. In other approaches, input position to the right may cause the viewline 302 to tilt to the left or some other direction, as long as it is consistently reproducible. From this viewing angle along the viewline 302 through the frame 114, the positions of the various parallax layers will appear changed from the positions shown in FIG. 3A. This perceived shift in the positions of the parallax layers relative to the viewline 302 and frame 114 may be simulated once the viewline 302 is again positioned normal to the frame 114 by laterally transposing each parallax layer in FIG. 3B to the left by a different amount, the amount of movement being dependent on the stack order of the layers. This is referred to as a lateral movement of the parallax layers.

In FIG. 3C, this lateral movement of the parallax layers is shown in configuration 306 with the viewline 302 again positioned normal to the frame 114, while the input position is still directed to the right. The configuration 306 illustrates how the parallax layers shift laterally leftward to simulate the parallax effect. As shown, each of the parallax layers have been shifted to the left by appropriate amounts depending on their respective stack order, such that relative to the frame 114, the positions of the parallax layers is changed, while the position of the stationary layer 112 is unchanged. In this example, the amount of offset is smallest for the background layer 102 and greatest for layer 4 110, with intermediate amounts for layer 2 106 and layer 3 108.

It can be seen in FIG. 3C that layer 3 108 and layer 4 110 are now positioned below the stationary layer 112, while layer 2 106 has moved closer to the viewline 302. The amount of movement for each layer is indicated on the left side of the diagram by dashed arrows, while the stationary layer 112 is shown having "No Movement." The indications of movement, frame 114, viewline 302, x-y axis, and input position indicators are for descriptive purposes only, and are not reproduced in the media composition in an approach.

The parallax effect applied to the parallax layers in FIGS. 3A-3C may be modified and updated in real time as the input position is changed. For example, receiving a rotational input, where the input position is rotated around the circle, may cause the parallax effect to gimbal about the viewline 302, continuously moving the positions of the parallax layers within the frame 114 in response to changes in the input position with a circular effect.

Figure 4A:
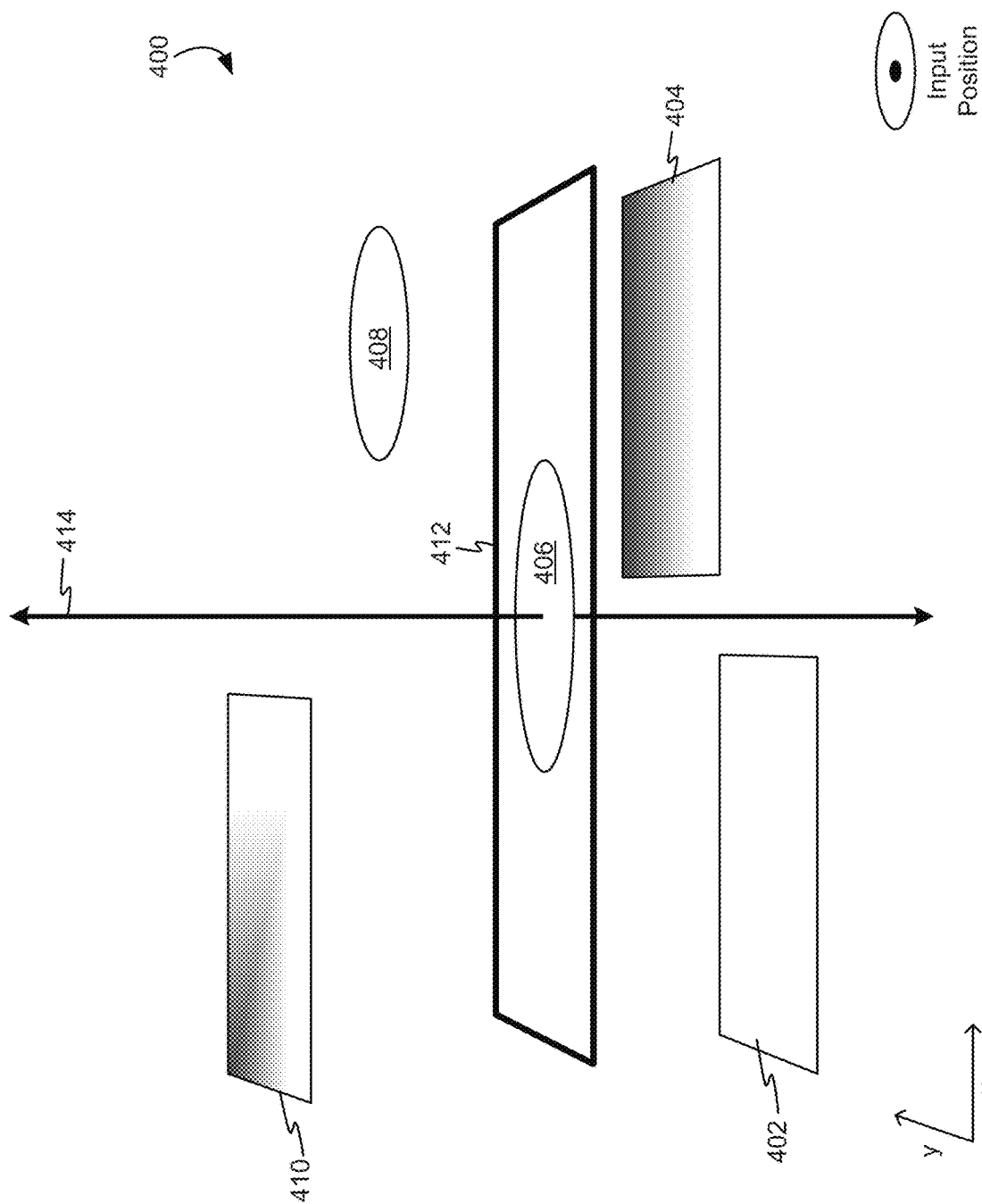

Now referring to FIGS. 4A-4E a parallax effect is shown being applied to a set of stacked visual elements in a media composition, in an example. FIG. 4A shows a configuration 400 of stacked elements with a neutral input position (indicated as a black circle centered within the white circle). The x-y plane is shown laid out with the x-axis being in the width direction, and the y-axis extending into the page with a small amount of perspective added to the layers for clarity. Also, the separation between the layers is exaggerated to aid in understanding how the parallax effect works on a layer-by-layer basis.

The viewline 414 is shown intersecting circular image 406 at its centerpoint and is positioned normal to the frame 412. This viewline 414 logically illustrates how the media composition will be viewed through the frame 412 on an electronic display device. The extent of the media composition (total area displayed) is set by the frame 412 that determines the viewable area of the media composition (the viewable area is determined by a width and a height of the frame 412 in one approach). The frame 412 is shown as a rectangular shape, but may have any two-dimensional shape as chosen by a designer of the media composition, such as circular, elliptical, triangular, pentagonal, hexagonal, etc. Moreover, the size and shape of the frame 412 may be chosen to integrate into a GUI, as previously described.

Each of the visual elements is comprised in an individual layer that are stacked within the media composition, such that the media composition comprises a plurality of layers, each layer comprising a visual element. In the present descriptions, layer and visual element may be used interchangeably to describe the objects in the media composition. In the example of FIG. 4A, the stacked elements include, starting with a lowest layer: rectangular image 402, rectangular video 404, circular image 406, circular image 408, and rectangular video 410. All of these layers are selected to have the parallax effect applied except for circular image 406. Moreover, as shown, the frame 412 is centered on circular image 406, but may conceptually be located inline with, above, or below any of the layers, as it simply denotes the viewable area of the media composition.

The frame 412, x-y axis, and input position indicator are for descriptive purposes only, and are not reproduced in the media composition in one approach. In another approach, the frame 412 may be visible to indicate a border around the media composition.

Now referring to FIG. 4B, a top-down view of the media composition in configuration 400 from FIG. 4A is shown with the neutral input position. As can be seen in FIG. 4B, the rectangular video 410 is positioned above the upper left corner of the circular image 406. Circular image 406 is positioned adjacent circular image 408, and overlaps with rectangular image 402 and rectangular video 404. Moreover, circular image 408 overlaps with rectangular video 404 as well in configuration 400.

Figure 4C:
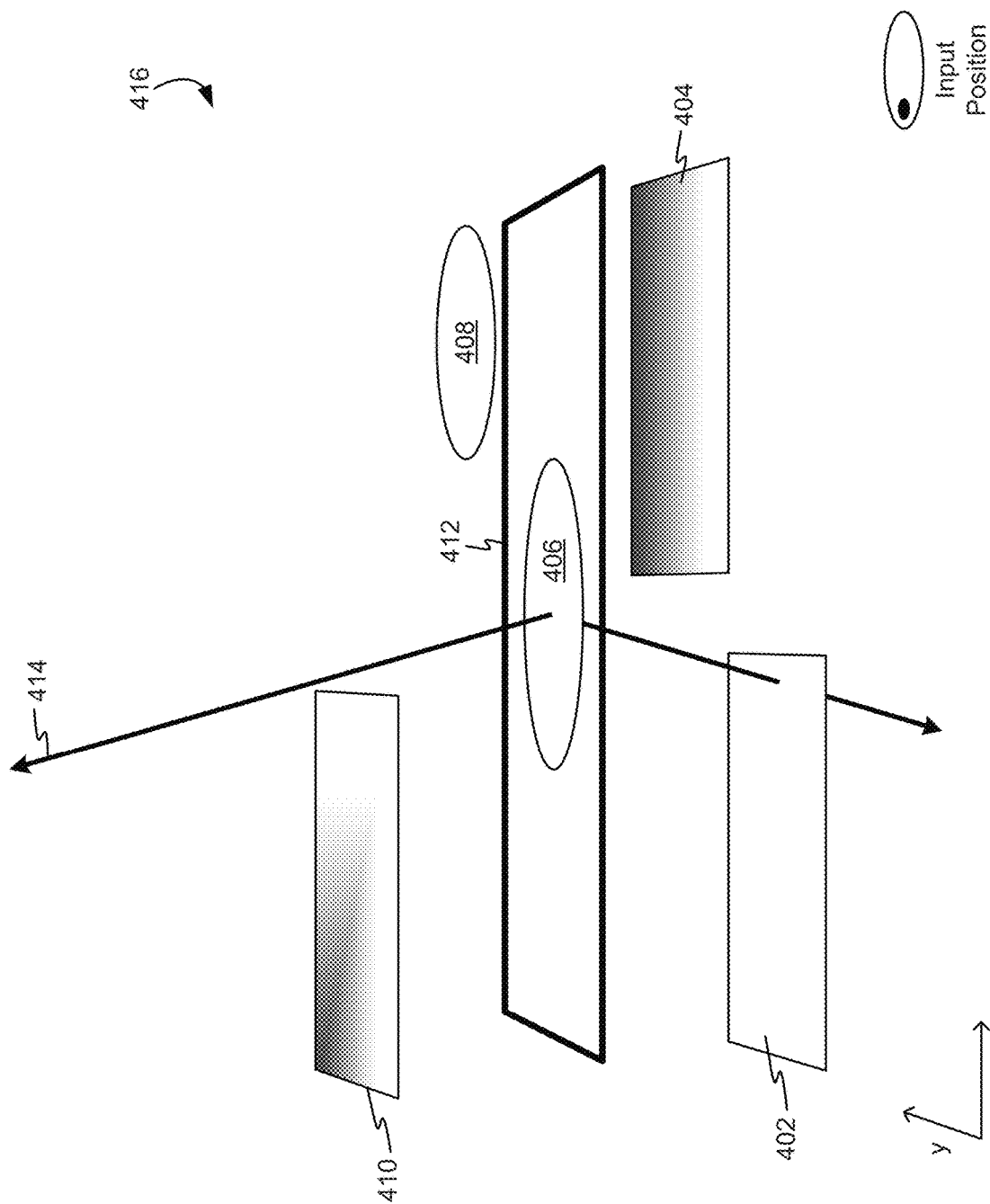

Now referring to FIG. 4C, a side view of the media composition is shown in configuration 416 with a left input position. As shown, in this configuration 416, the viewline 414 has two portions, an upper portion extending above the circular image 406 and a lower portion extending below the circular image 406. Both portions of the viewline 414 are tilted to the left in response to the input position directed to the left, and are positioned closer to elements on the left of the media composition and farther from elements on the right side of the media composition. In other approaches, input position to the left may cause the viewline 414 to tilt to the left or some other direction, as long as it is consistently reproducible. This configuration 416 is an example of a bisected parallax effect, where the origin of the parallax effect is positioned at a point within the various layers of the media composition (in this example, coinciding with the circular image 406) instead of being positioned at a lowest or highest layer as described previously. In other approaches, the origin of the parallax effect may be positioned anywhere—between, in, above, or below the layers of the media composition.

From this viewing angle along the viewline 414 through the frame 412, the positions of the various parallax layers will appear changed from the positions shown in FIG. 4A. This perceived shift in the positions of the parallax layers relative to the viewline 414 and frame 412 may be simulated once the viewline 414 is again positioned normal to the frame 412 by laterally transposing each parallax layer in FIG. 4C to the right by a different amount, the amount of movement being dependent on the stack order of the layers above and below the origin at the circular image 406.

Figure 4D:
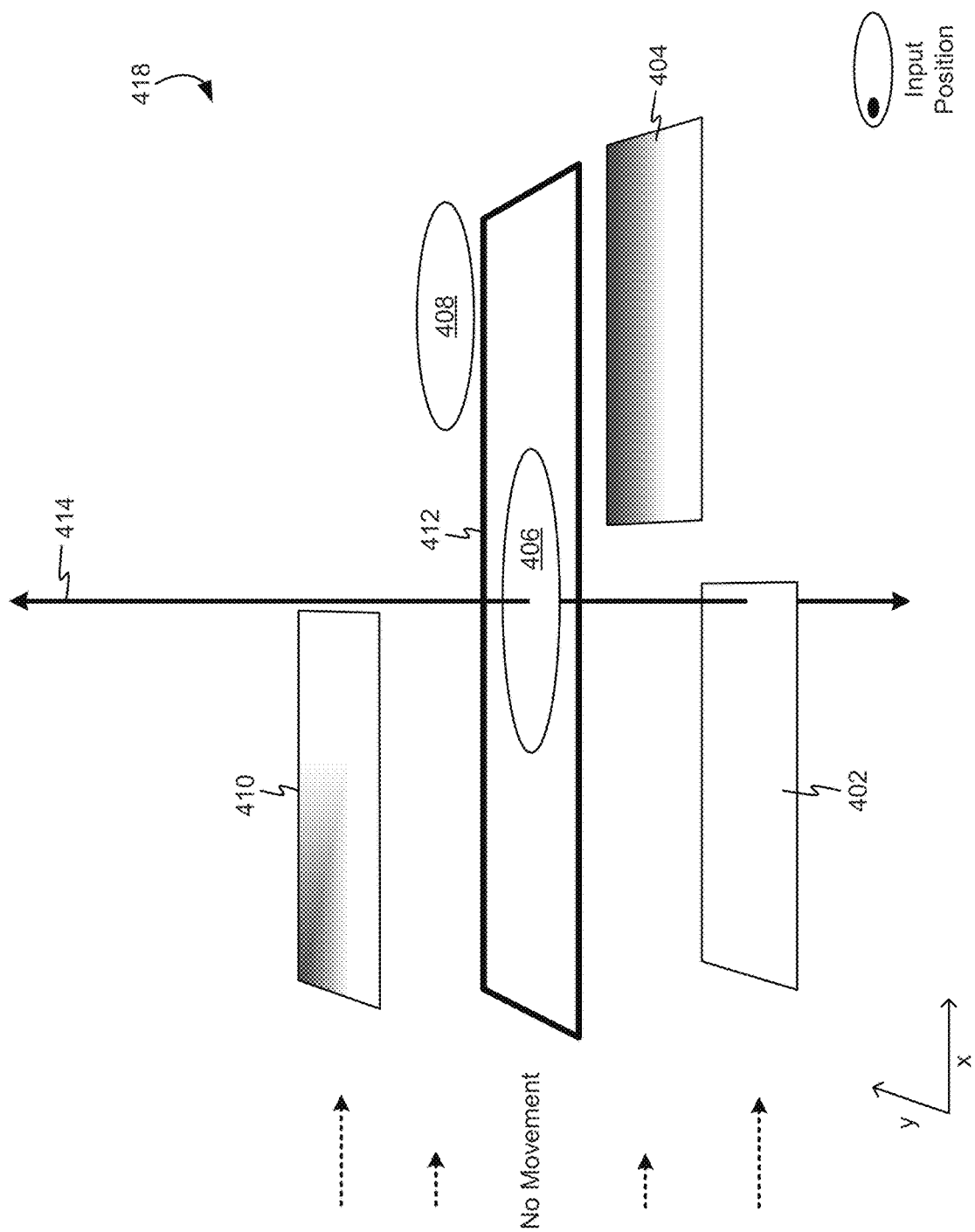

Now referring to FIG. 4D, this lateral movement of the parallax layers is shown in configuration 418 with the viewline 414 again positioned normal to the frame 412, while the input position is still directed to the left. The configuration 418 illustrates how the parallax layers shift laterally rightward to simulate the parallax effect. As shown, each of the parallax layers have been shifted to the right by appropriate amounts depending on their respective stack order above and below the origin at the circular image 406. The amount of movement for each layer relative to the frame 412 is indicated on the left side of the diagram by dashed arrows, while the circular image 406 is shown having "No Movement." In this example, the amount of offset is smallest for the circular image 408 and rectangular video 404, and greatest for the rectangular video 410 and rectangular image 402.

Figure 4E:
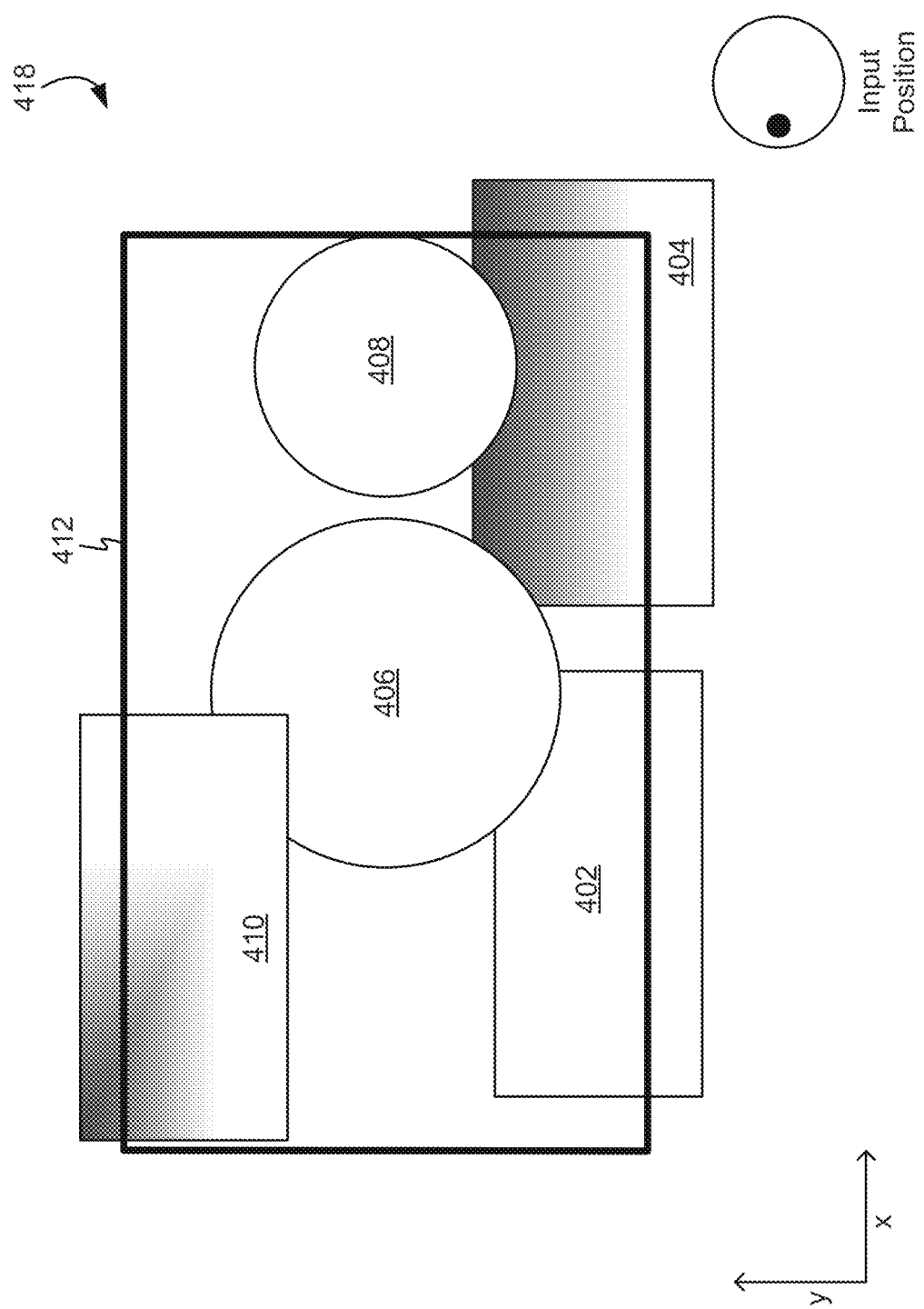

It can be seen in FIG. 4E, a top-down view of configuration 418, that all parallax layers have shifted to the right in response to the input position being to the left. The circular image 408 is now positioned away from circular image 406 (they are no longer adjacent) and above rectangular video 404. Also, the layering of the elements is unchanged from FIG. 4B, with rectangular video 410 positioned above circular image 406, which in turn is positioned above rectangular image 402 and rectangular video 404.

The parallax effect applied to the parallax layers in FIGS. 4A-4E may be modified and updated in real time as the input position is changed. For example, receiving a rotational input, where the input position is rotated around the circle, may cause the parallax effect to gimbal about the viewline 414, continuously moving the positions of the parallax layers within the frame 412 in response to changes in the input position with a circular effect. The indications of movement, frame 412, viewline 414, x-y axis, and input position indicators are for descriptive purposes only, and are not reproduced in the media composition in an approach.

Figure 5A:
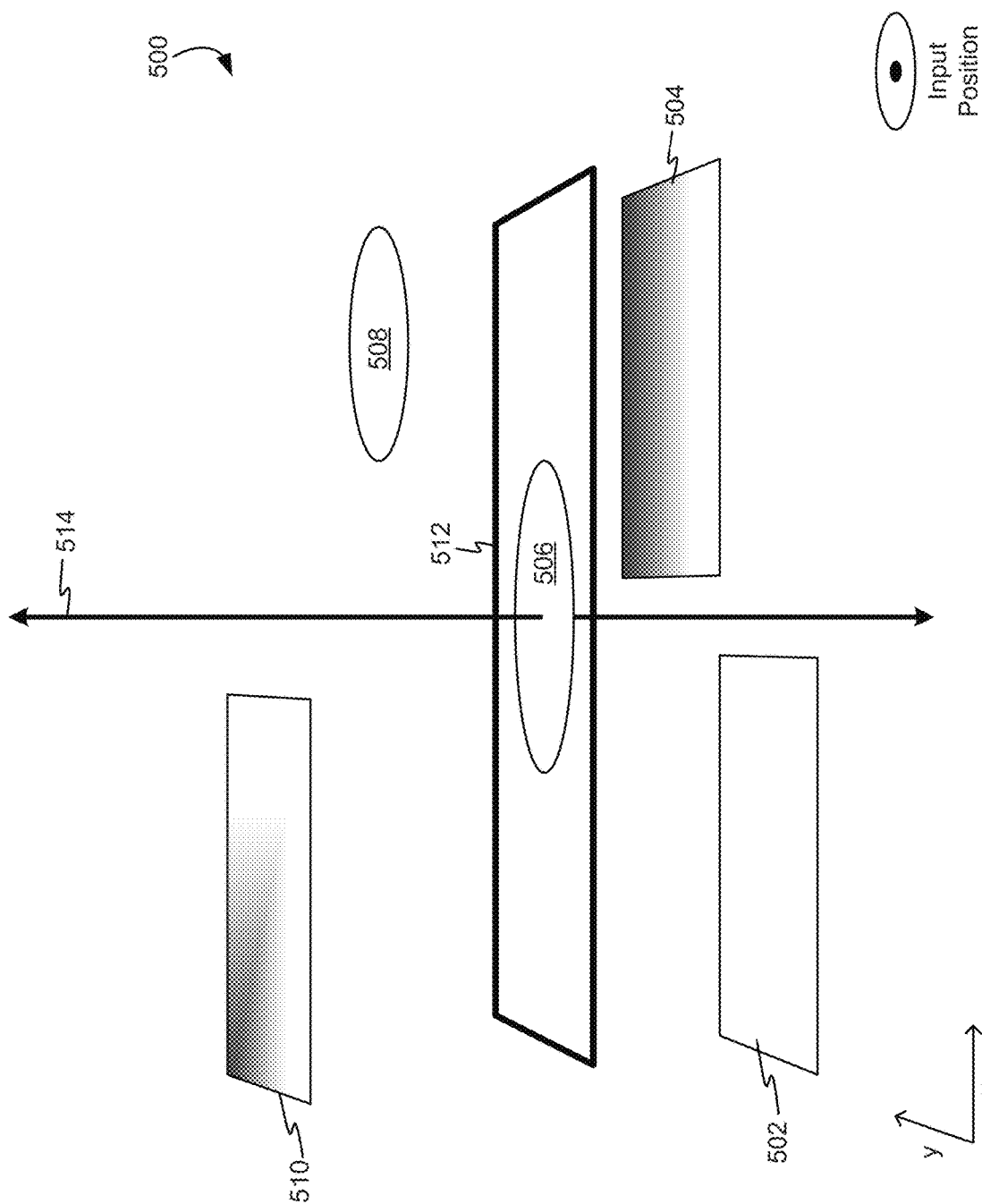

FIGS. 5A-5E show a parallax effect being applied to a set of stacked visual elements in a media composition, in an example. FIG. 5A shows a configuration 500 of stacked elements with a neutral input position. The x-y plane is shown laid out with the x-axis being in the width direction, and the y-axis extending into the page with a small amount of perspective added to the layers for clarity. Also, the separation between the layers is exaggerated to aid in understanding how the parallax effect works on a layer-by-layer basis.

The viewline 514 is shown intersecting circular image 506 at its centerpoint and is positioned normal to the frame 512. This viewline 514 logically illustrates how the media composition will be viewed through the frame 512 on an electronic display device. The extent of the media composition (total area displayed) is set by the frame 512 that determines the viewable area of the media composition (the viewable area is determined by a width and a height of the frame 512 in one approach). The frame 512 is shown as a rectangular shape, but may have any two-dimensional shape as chosen by a designer of the media composition, such as circular, elliptical, triangular, pentagonal, hexagonal, etc. Moreover, the size and shape of the frame 512 may be chosen to integrate into a GUI, as previously described.

Each of the visual elements is comprised in an individual layer that are stacked within the media composition, such that the media composition comprises a plurality of layers, each layer comprising a visual element. In the present descriptions, layer and visual element may be used interchangeably to describe the objects in the media composition. In the example of FIG. 5A, the stacked elements include, starting with a lowest layer: rectangular image 502, rectangular video 504, circular image 506, circular image 508, and rectangular video 510. All of these layers are selected to have the parallax effect applied except for circular image 506. Moreover, as shown, the frame 512 is centered on circular image 506, but may conceptually be located inline with, above, or below any of the layers, as it simply denotes the viewable area of the media composition.

The frame 512, x-y axis, and input position indicator are for descriptive purposes only, and are not reproduced in the media composition in one approach. In another approach, the frame 512 may be visible to indicate a border around the media composition.

Figure 5B:
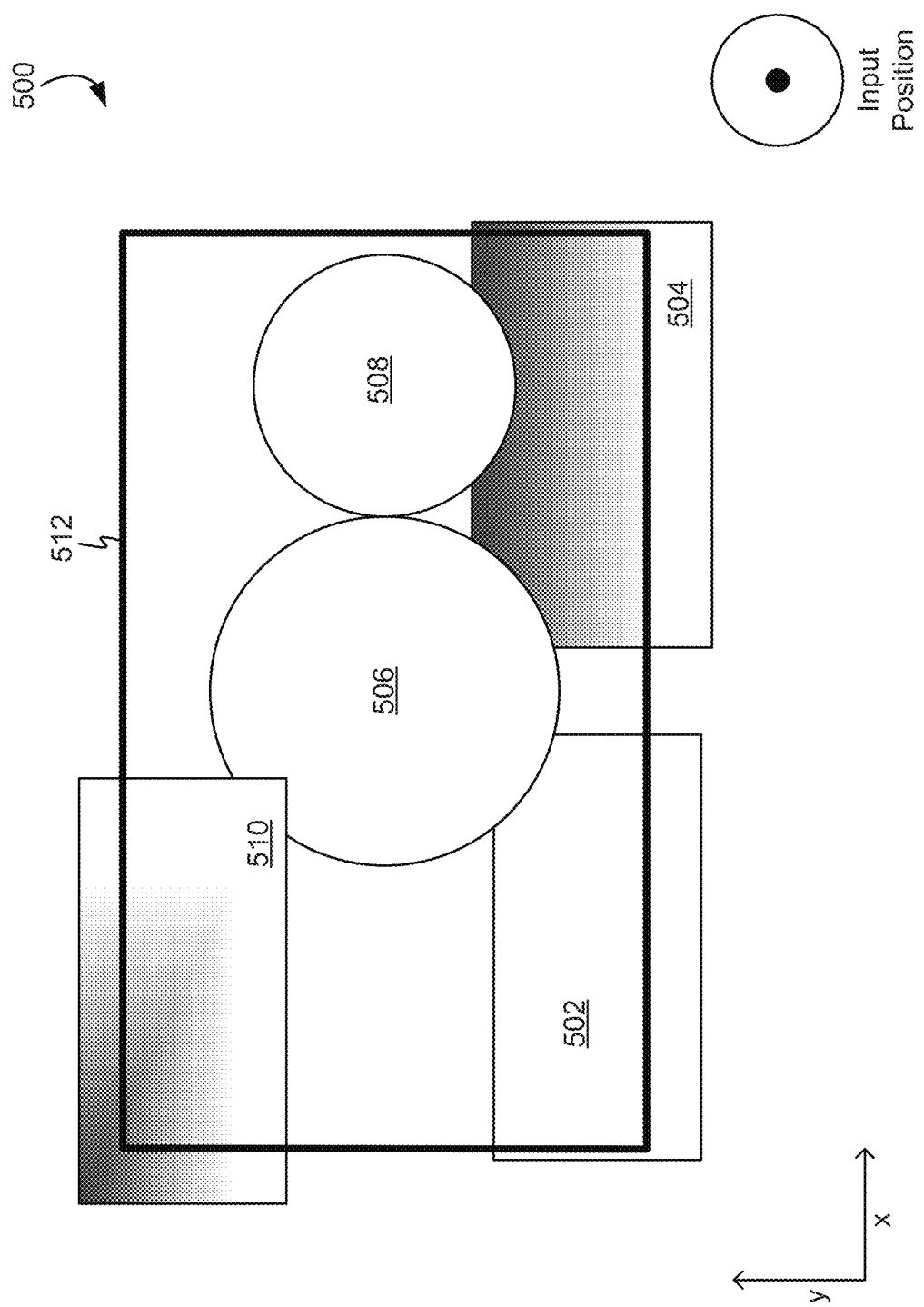

Now referring to FIG. 5B, a top-down view of the media composition in configuration 500 from FIG. 5A is shown with the neutral input position. As can be seen in FIG. 5B, the rectangular video 510 is positioned above the upper left corner of the circular image 506. Circular image 506 is positioned adjacent circular image 508, and overlaps with rectangular image 502 and rectangular video 504. Moreover, circular image 508 overlaps with rectangular video 504 as well in configuration 500.

Now referring to FIG. 5C, a side view of the media composition is shown in configuration 520 with a right input position. As shown, in this configuration 520, the viewline 514 is tilted to the right in response to the input position directed to the right, and is centered through the centerpoint of the circular image 506. This tilting of the viewline 514 causes the rectangular video 510 positioned above the circular image 506 and the rectangular video 504 positioned below the circular image 506 to appear farther from the viewline 514, while the circular image 508 positioned above the circular image 506 and the rectangular image 502 positioned below the circular image 506 to appear closer to the viewline 514. In other approaches, input position to the right may cause the viewline 514 to tilt to the left or some other direction, as long as it is consistently reproducible. This configuration 520 is an example of a parallax effect that has an origin positioned at a point within the various layers of the media composition (in this example, coinciding with the circular image 506) instead of being positioned at a lowest or highest layer as described previously. In other approaches, the origin of the parallax effect may be positioned anywhere—between, in, above, or below the layers of the media composition.

From this viewing angle along the viewline 514 through the frame 512, the positions of the various parallax layers will appear changed from the positions shown in FIG. 5A. This perceived shift in the positions of the parallax layers relative to the viewline 514 and frame 512 may be simulated once the viewline 514 is again positioned normal to the frame 512 by laterally transposing each parallax layer in FIG. 5C to the appropriate direction by a different amount, the amount of movement being dependent on the stack order of the layers above and below the origin at the circular image 506.

Figure 5D:
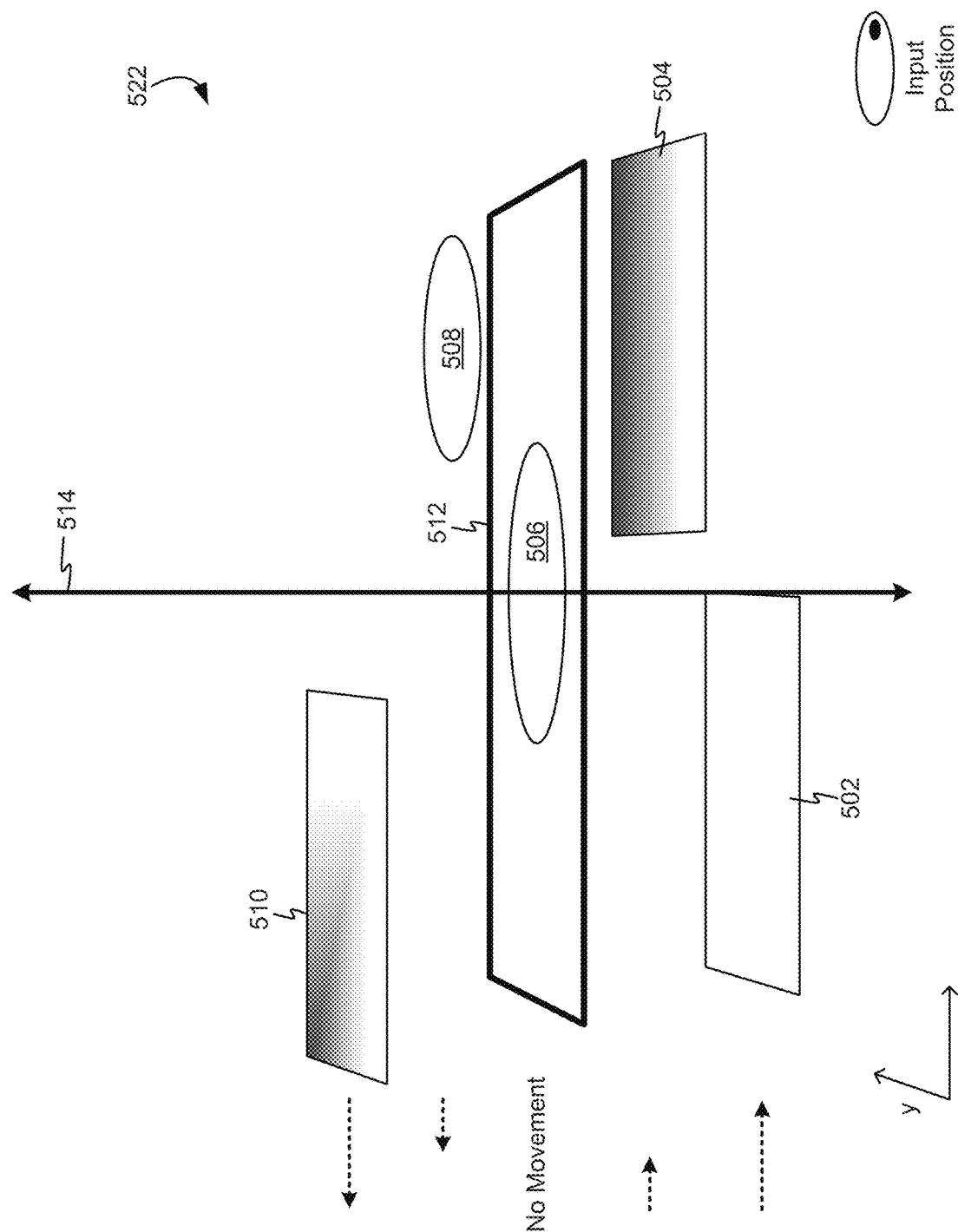

Now referring to FIG. 5D, this lateral movement of the parallax layers is shown in configuration 522 with the viewline 514 again positioned normal to the frame 512, while the input position is still directed to the right. The configuration 522 illustrates how the parallax layers positioned above the origin layer (circular image 506) shift laterally to the left while the parallax layers positioned below the origin layer shift laterally to the right to simulate the parallax effect. As shown, each of the parallax layers have been shifted by appropriate amounts depending on their respective stack order above and below the origin at the circular image 506. The amount of movement for each layer relative to the frame 512 is indicated on the left side of the diagram by dashed arrows, while the circular image 506 is shown having "No Movement." In this example, the amount of offset is smallest for the circular image 508 and rectangular video 504, and greatest for the rectangular video 510 and rectangular image 502.

Figure 5E:
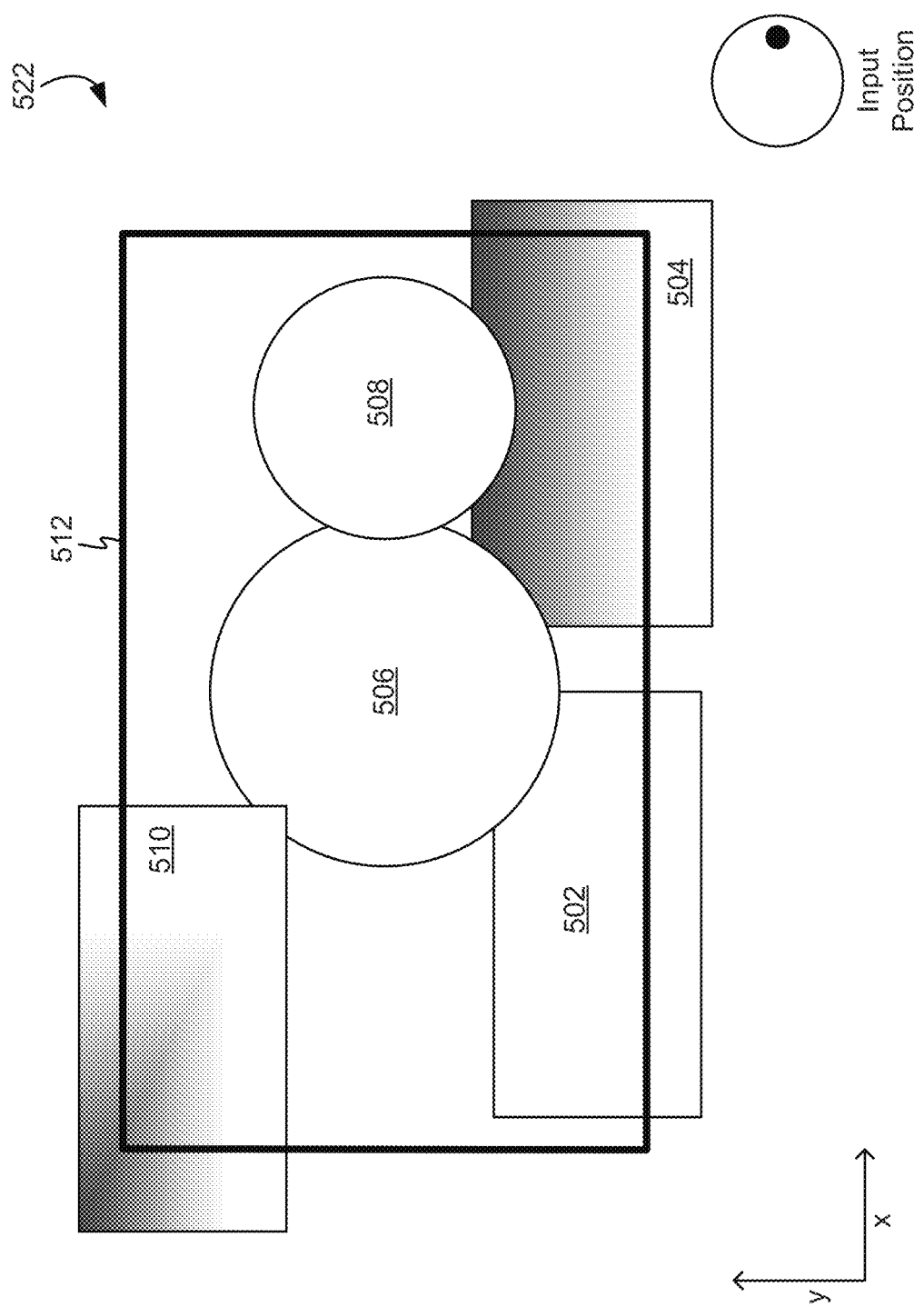

It can be seen in FIG. 5E, a top-down view of configuration 522, that all parallax layers have shifted in response to the input position being to the right. The circular image 508 is now overlapping the circular image 506 (they are no longer simply adjacent one another) and above rectangular video 504. Also, the layering of the elements is unchanged from FIG. 5B, with rectangular video 510 positioned above circular image 506, which in turn is positioned above rectangular image 502 and rectangular video 504.

The parallax effect applied to the parallax layers in FIGS. 5A-5E may be modified and updated in real time as the input position is changed. For example, receiving a rotational input, where the input position is rotated around the circle, may cause the parallax effect to gimbal about the viewline 514, continuously moving the positions of the parallax layers within the frame 512 in response to changes in the input position with a circular effect. The indications of movement, frame 512, viewline 514, x-y axis, and input position indicators are for descriptive purposes only, and are not reproduced in the media composition in an approach.

Any of the methods and techniques described in FIGS. 1A-1E, 2A-2B, 3A-3C, 4A-4E, and 5A-5E may be used to produce a layered stack media asset that is reproducible by one or more computing products known in the art for rendering graphics. The computing product may be capable of displaying packages, zip files, containers, files, images, videos, etc. The media asset includes all data and information needed to render and play the media composition while providing a parallax effect responsive to an input position to selected visual elements therein. The media asset includes image, animation, and video dimensions, blend-mode effects to be used on a per layer basis, looping information, positional information for each visual element, and shifts for the visual elements in response to changing input position.

Moreover, in some approaches, the media asset includes a default image for each visual element, including animations and videos of the media composition, when applicable, that are displayed in place of the animation or video content under certain circumstances. In one approach, the default images are displayed when loading the animation or video. This is useful for ensuring that the media composition does not lack a visual element in case processing power, processing capacity, network bandwidth, or other computing resource inhibits a seamless integration of the parallax effect for one or more of the visual elements of the media composition. In other words, should a video or animation have trouble loading, a default image, which is included in the media file, may be displayed until the video or animation is loaded successfully.

The media asset also include configuration information that describes how the visual elements in the media composition change in response to the input position, particularly how the parallax effect is applied to each visual element, whether the visual element is static, how much parallax effect is applied to the media composition, what kinds of visual elements are included in the media composition, and any other information that is used in producing the media composition.

Adding Transparency to Videos

Figure 6B:
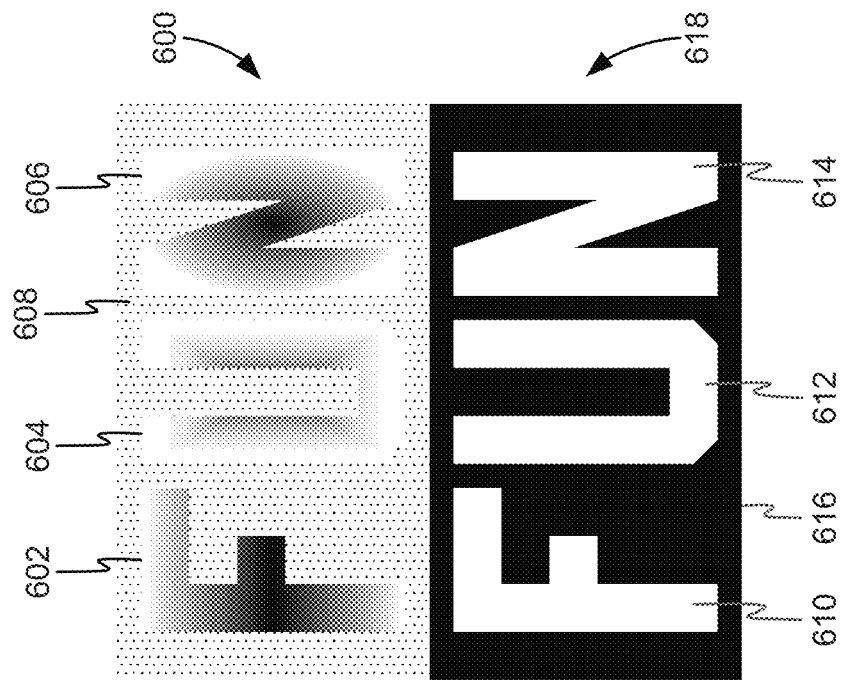
FIGS. 6A-6B show a method for adding transparency to a video element according to one example.
Figure 6A:
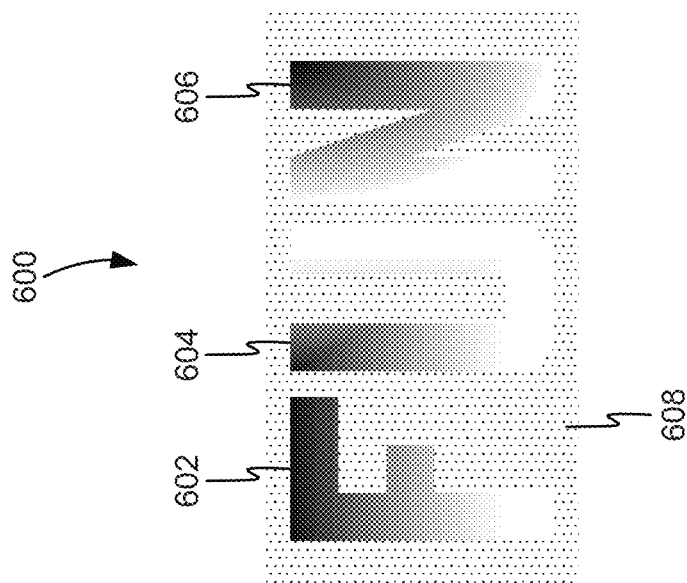

Now referring to FIGS. 6A-6B, a method for adding transparency to a video 600 is shown according to one example. In this example, the video 600 includes the word "FUN" which changes as the video is played, as illustrated by the changing shaded letters "F," "U," and "N" from FIG. 6A to FIG. 6B. Of course, in implementations described herein, any video content may be used as the basis for creating a video with transparency included, starting with an original video which does not natively include transparency or alpha channel. Moreover, any type of digital format or container may be used to store the video as would be known to one of skill in the art, such as Audio Video Interleave (AVI), Flash Video Format (FLV), Matroska Multimedia Container (MKV), Windows™ Media Video (WMV), Apple™ QuickTime™ Movie (MOV), Moving Pictures Expert Group 4 (MP4), etc. The video content changes over time to create the illusion of movement, and therefore is not a static image.

Referring again to FIG. 6A, the original video 600 includes the letters "F" 602, "U" 604, and "N" 606 surrounded by a background 608, which may be opaque or otherwise include moving video information that is not transparent. For inclusion in a media composition, in this example, transparency is desired to surround the word, rather than showing the background 608 from the original video 600. It is desired to only include the letters as video surrounded by transparency to allow for layers and content behind and between the spaces in the letters to be seen once the media composition is assembled. In other words, the letters will float above any other layers positioned behind the letters with no extraneous video content to obscure the lower layers. However, using a typical video, this opaque background would be visible and obscure any layers positioned below the video.

In order to overcome this deficiency, a method is described that provides transparency or alpha channel to a video 600 which lacks transparency in its native definition or format. The method starts with the original video 600, and then, as shown in FIG. 6B, creates a secondary video track 618 that includes visual information for only the portions of the original video 600 that are to be reproduced, with this visual information being full white (#FFFFFF) in the secondary video track 618. In this example, the portions that are to be reproduced are the letters "F" 610, "U" 612, and "N" 614, which are shown in full white. However, any color may be used to indicate the portion of the video 600 that is to be reproduced, in various approaches.

The remaining portion 616 of the secondary video track 618 that contains no visual information is shown in FIG. 6B as being full black (#000000). However, any color other than that being used to reproduce the desired video portion (e.g., the letters "F" 610, "U" 612, and "N" 614) may be used to indicate the portion of the video 600 that is to be reproduced, in various approaches.

Once the secondary video track 618 is created, it is added to the original video 600 and stored to a computer readable medium as a single entity (e.g., a file). This multiple track video may be reproduced using a filter that is configured to read the secondary video track 618 and only reproduce the portions of the original video 600 that coincide with the desired portions indicated by the secondary video track 618. this may be accomplished using a filter to detect the white portions of the secondary video track 618. In approaches where a different color is used for the letters "F" 610, "U" 612, and "N" 614 in the secondary video track 618, then the filter detects this color instead of white to determine which portions of the original video 600 to reproduce.

Figure 7A:
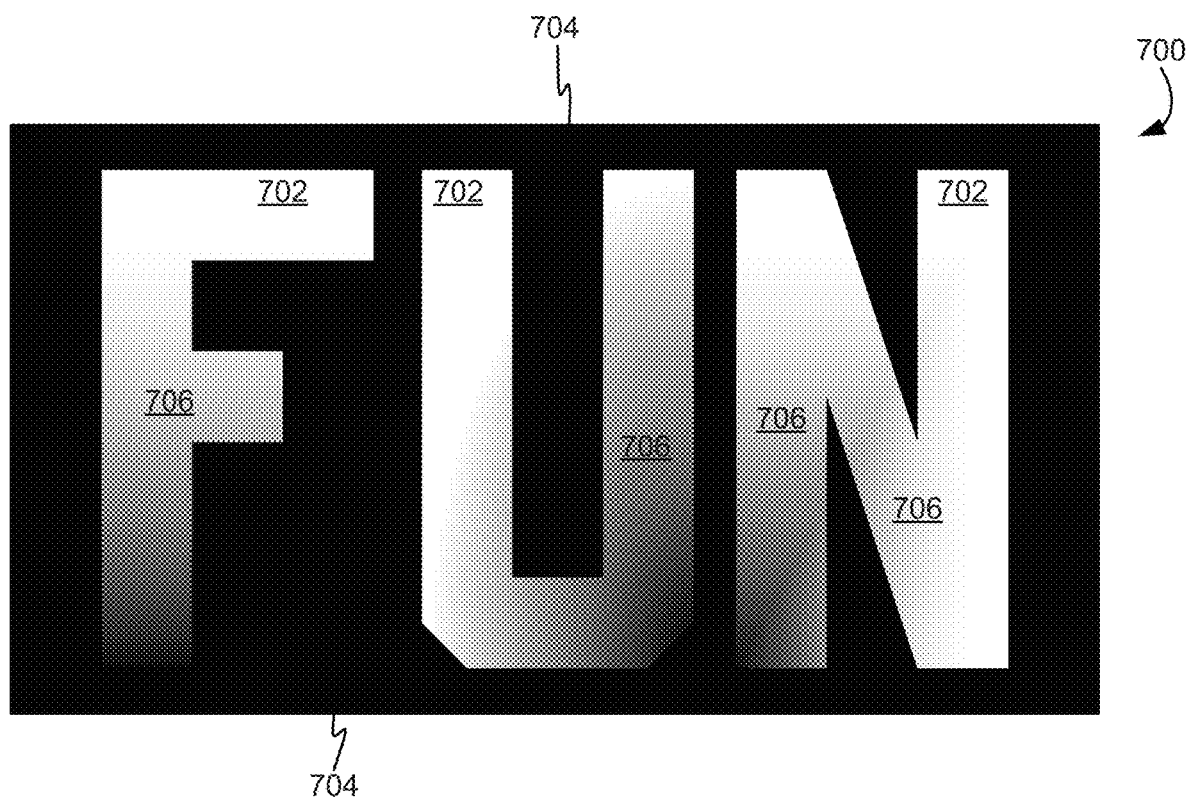
FIGS. 7A-7B show another method for adding transparency to a video element according to an example.
Figure 7B:
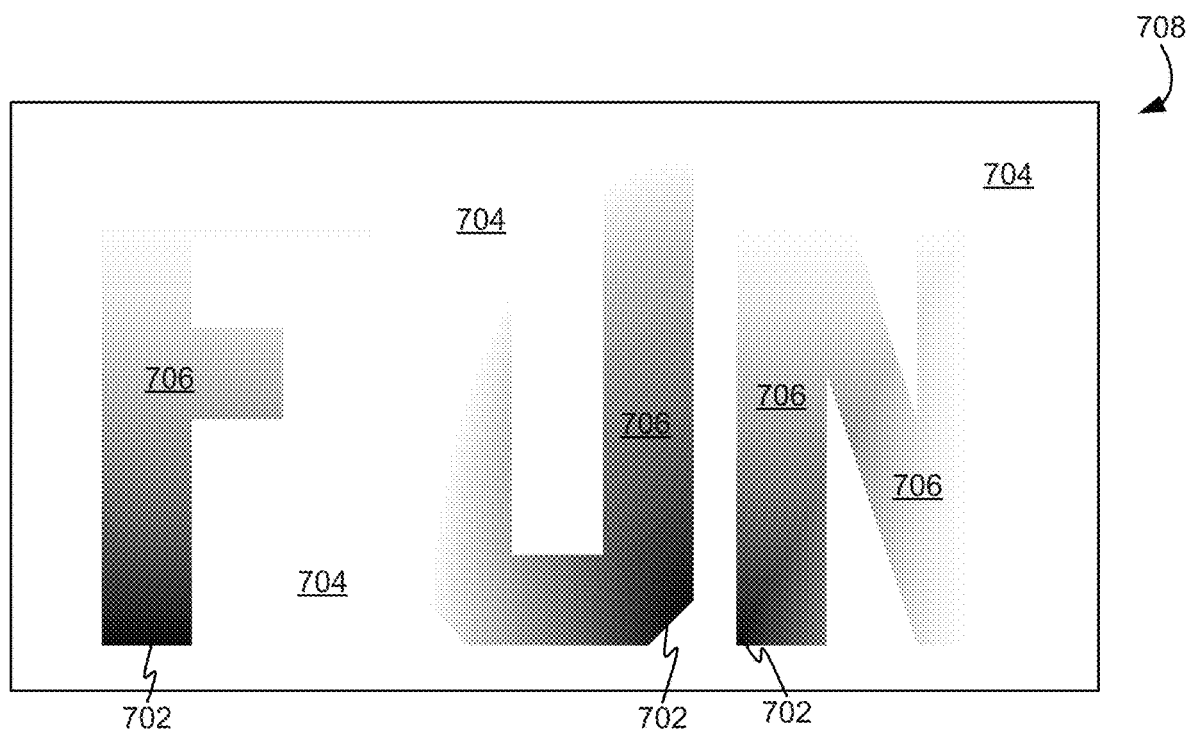

With reference to FIGS. 7A-7B, another method for adding transparency to a video is shown according to several examples. FIG. 7A shows an example with a video 700 that includes the word "FUN" with a black background. In this method, a filter is configured that may be applied to the video 700 to provide transparency or alpha channel to portions of the video 700 which match predetermined color hues.

In an example, all portions of the video 700 which are black (#000000) will be made transparent upon reproduction, while all portions of the video 700 which are white (#FFFFFF) will be reproduced as opaque. Any other color hues in the video 700, such as red, blue, green, shades thereof, and any shade of grey, will be reproduced semi-transparent based on the amount of color hue included therein. For example, pure blue (#0000FF), pure red (#FF0000), and pure green (#00FF00) may each be reproduced as being 33% transparent (and 67% opaque) when the filter is applied to the video 700.

As shown in FIG. 7A, upon applying the filter, portions 702 of the letters "F," "U," and "N" will be reproduced as opaque, portions 704 surrounding the letters will be reproduced transparent, and portions 706 of the letters "F," "U," and "N" will be reproduced as semi-transparent depending on the specific color hue and the filter settings.

In another example, pure blue (#0000FF), pure red (#FF0000), and pure green (#00FF00) may each be reproduced as being 67% transparent (and 33% opaque) when the filter is applied to the video 700.

As the coloring of the video changes over time while the video 700 is played, the portions of the video 700 which are fully transparent and those which are fully opaque will also change to match the change in color hues, providing a life-like reproduction effect for the transparency. This method is particularly applicable to adding effects to a media composition, such as smoke, lens flare, and bright lights in addition to other pre-existing elements.

In one approach, the video may be modified prior to applying the filter to produce a better rendering of the transparent portions. In an example, pixel colors in the video 708 may be flattened, reduced, and/or compressed to increase the portions of the video which are full white and therefore made transparent upon rendering. This increase in the white portions of the video allows for the desired black portions to be the only visible portions of the video with less semi-transparent content. In one embodiment, the brightness of the video may be increased to increase a percentage of the video that contains full white pixels. In another embodiment, the brightness of the video may be decreased to increase a percentage of the video that contains full black pixels.

This modification of the color hues of the pixels is particularly useful for editing videos which include noise (color hues spread across the video 700 in positions that are desired to be made transparent upon applying the filter).

Any other modification or processing of the video may be performed prior to providing the transparency as would be known to one of skill in the art, while still allowing for transparency to be added to the video. This allows for non-native video formats to have an alpha channel added thereto for use in a media composition that includes layers of elements.

FIG. 7B shows an example with a video 708 that includes the word "FUN" with a white background. In this method, a filter is configured that may be applied to the video 708 to provide transparency or alpha channel to portions of the video 708 which match one or more predetermined color hues. However, in this example, all portions of the video 708 which are black (#000000) will be made opaque (and visible in its original form) upon reproduction, while all portions of the video 708 which are white (#FFFFFF) will be reproduced as transparent. Any other color hues in the video 708, such as red, blue, green, shades thereof, and any shade of grey, will be reproduced semi-transparent based on the amount of color hue included therein. For example, pure blue (#0000FF), pure red (#FF0000), and pure green (#00FF00) may each be reproduced as being 67% transparent (and 33% opaque) when the filter is applied to the video 708.

As shown in FIG. 7B, upon applying the filter, portions 702 of the letters "F," "U," and "N" will be reproduced as opaque, portions 704 surrounding the letters will be reproduced transparent, and portions 706 of the letters "F," "U," and "N" will be reproduced as semi-transparent depending on the specific color hue and the filter settings.

In another example, pure blue (#0000FF), pure red (#FF0000), and pure green (#00FF00) may each be reproduced as being 33% transparent (and 67% opaque) when the filter is applied to the video 700.

As the coloring of the video changes over time while the video 708 is played, the portions of the video 708 which are fully transparent and those which are fully opaque will also change to match the change in color hues, providing a life-like reproduction effect for the transparency. This method is particularly applicable to adding effects to a media composition, such as smoke, gloom, and age-induced wear to be shown on or in addition to other pre-existing elements.

In one approach, the video may be modified prior to applying the filter to produce a better rendering of the transparent portions. In an example, pixel colors in the video 708 may be flattened, reduced, and/or compressed to increase the portions of the video which are full white and therefore made transparent upon rendering. This increase in the white portions of the video allows for the desired black portions to be the only visible portions of the video with less semi-transparent content. In one embodiment, the brightness of the video may be increased to increase a percentage of the video that contains full white pixels. In another embodiment, the brightness of the video may be decreased to increase a percentage of the video that contains full black pixels.

This modification of the color hues of the pixels is particularly useful for editing videos which include noise (color hues spread across the video 708 in positions that are desired to be made transparent upon applying the filter).

Any other modification or processing of the video may be performed prior to providing the transparency as would be known to one of skill in the art, while still allowing for transparency to be added to the video. This allows for non-native video formats to have an alpha channel added thereto for use in a media composition that includes layers of elements.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 8:
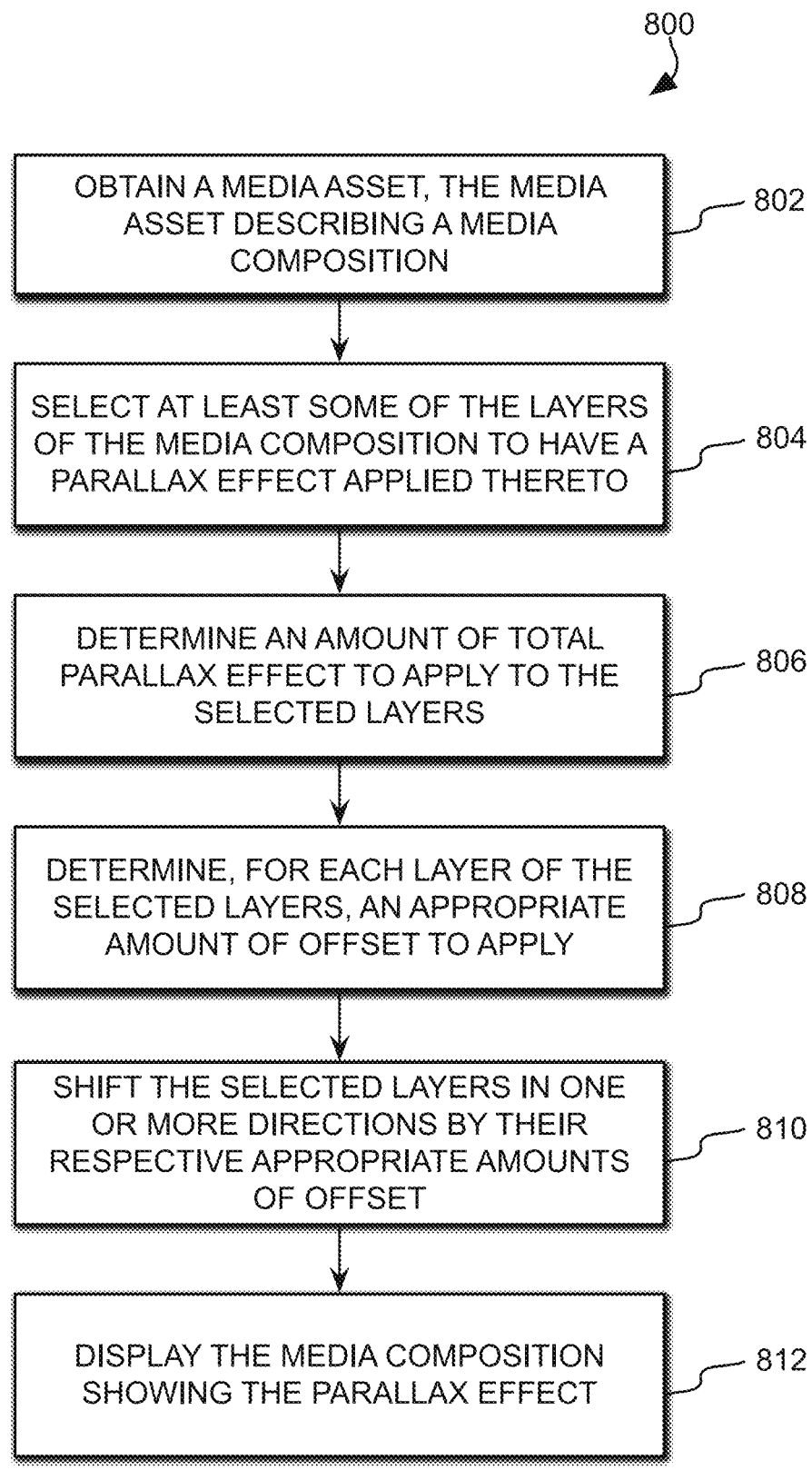
FIG. 8 is flow diagram of an example process for applying a parallax effect to a set of stacked visual elements.

FIG. 8 is flow diagram of an example process for applying a parallax effect to a set of stacked visual elements. In operation 802, a media asset describing a media composition is obtained. The media asset may include some or all data and information needed to render and play a media composition, along with information describing a parallax effect to be applied to the media composition (or layers thereof). In one embodiment, the parallax effect may be responsive to an input position. The media asset includes positional information for each visual element and shifts for the visual elements in response to changing input position (or some other trigger or condition). The media composition comprises a plurality of layers, each layer including a visual element. In various examples, the media composition may include video elements, image elements, animation, etc., and may be of any type of media composition known in the art.

In an example, the media composition may be received from another electronic device, such as a mobile phone, laptop computer, media server, home media television device, etc. In another example, the media composition may be created based on the individual visual elements, with layering and positioning information included to present a complete media composition. Such a media composition may be created using an application specific to designing, assembling, and creating media compositions.

In operation 804, at least some of the layers of the media composition are selected to have a parallax effect applied thereto. In an example, the selection of which layers to have parallax effect applied thereto may be received as input from a designer or user. In another example, the selection of which layers to have parallax effect applied thereto may be automatically made as a result of historical preference, design and layout of the media composition, or some other basis on which to select certain layers for having the parallax effect applied thereto as would be understood by one of skill in the art. In one example, all layers of the media composition may be automatically selected to have the parallax effect applied thereto as a default setting.

In operation 806, an amount of total parallax effect to apply to the selected layers is determined. The amount of total parallax effect may be determined based on a frame size, a canvas size, a size of one or more layers of the media composition, or any other parameter related to the media composition and/or GUI in which the media composition will be displayed.

As shown in operation 808, an appropriate amount of offset is determined to apply to each of the selected layers on an individual basis. The determined appropriate amount of offset does not exceed the amount of total parallax effect. In one approach, the amount of offset may be determined based on an input position. The input position may be received through a user input device, such as a mouse, trackpad, remote controller, etc.

In operation 810, the selected layers are shifted in one or more directions by their respective appropriate amounts of offset. In one approach, the one or more directions of shift may be determined based on the input position. In another approach, the one or more directions of shift may be rotated continuously to provide a gimbal effect for the media composition.

As shown in operation 812, the media composition showing the parallax effect is displayed. The media composition may be displayed on an electronic display device, and may, in some approaches, be shown in a GUI that displays other media compositions for selection therefrom.

Figure 9:
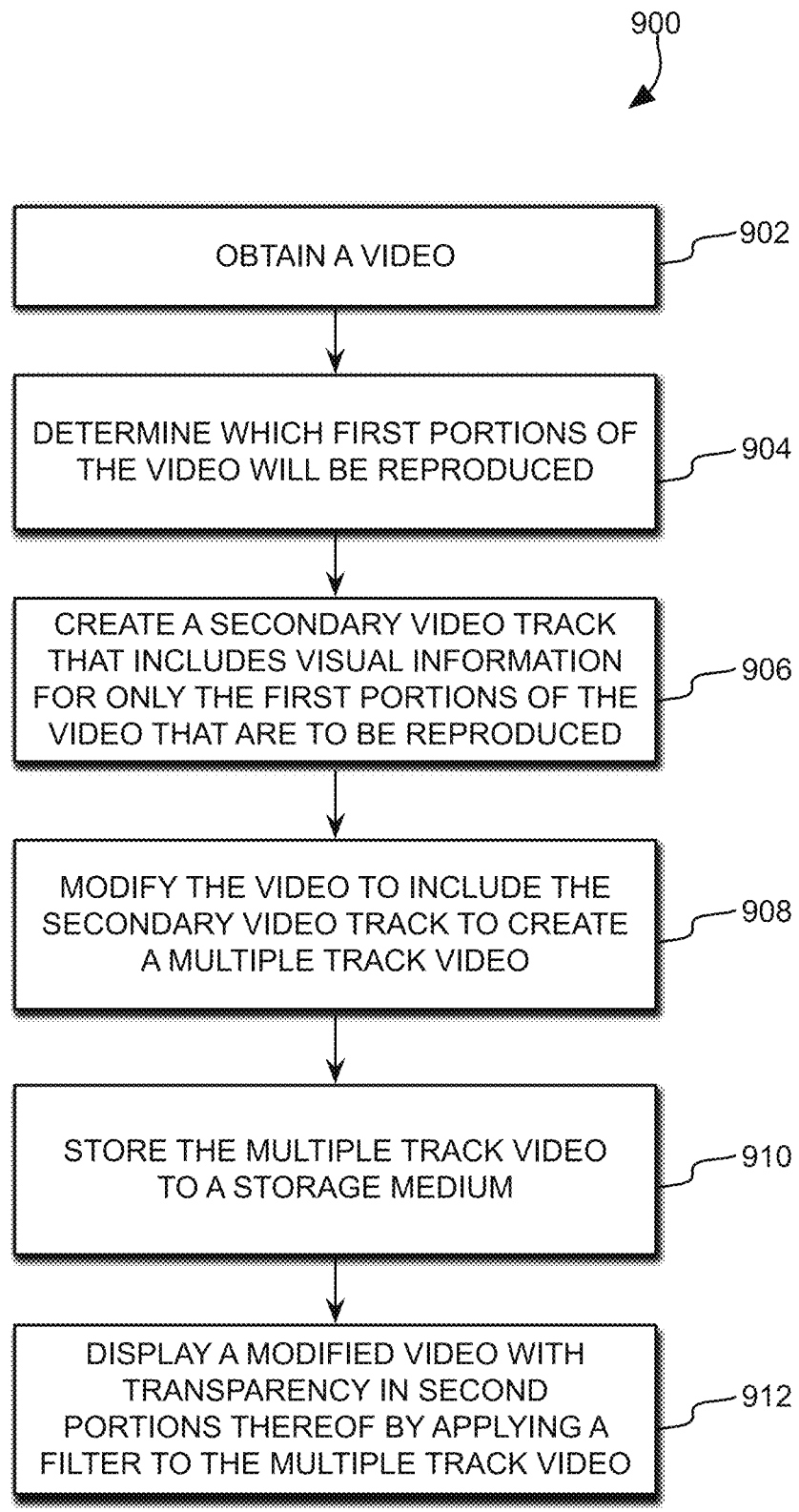
FIG. 9 is flow diagram of an example process for providing transparency to a video.

FIG. 9 is flow diagram of an example process for providing transparency to a video. In operation 902, a video is obtained. In an example, the video may be created, received from another electronic device, retrieved from a storage medium, or in some other way attained. In one approach, the video lacks transparency in its native definition or format.

In operation 904, it is determined which first portions of the video will be reproduced without alteration, and consequently which second portions of the video will be made transparent. This determination may be based on user input which selects a color hue from the video, and all of the color hues that match the selected color hue are marked for being made transparent. In another example, the determination may be made automatically, by selecting a background of the video to be made transparent. In other examples, a different portion of the video may be selected for transparency, depending on the video content included therein.

As shown in operation 906, a secondary video track is created that includes visual information for only the first portions of the video that are to be reproduced. In the secondary video track, the first portions of the video contain a single color hue, such as white (#FFFFFF) or black (#000000) in two examples, while the remaining portion of the secondary video track includes no visual data. However, any color may be used in the secondary video track to indicate the first portions of the video that are to be reproduced, in various approaches.

In operation 908, the video is modified to include the secondary video track which creates a multiple track video having the original video track and the secondary video track.

In operation 910, the multiple track video is stored as a single entity (e.g., a file) to a storage medium. In several approaches, the secondary video track may be reproduced below the original video, above the original video, or to one side of the original video.

In optional operation 912, a modified video having transparency in second portions thereof is displayed by applying a filter to the multiple track video. The filter is configured to read the secondary video track, detect the first portions of the secondary video track having the designated color (e.g., white or black), and only reproduce the first portions of the modified video that coincide with the first portions of the secondary video track.

Figure 10:
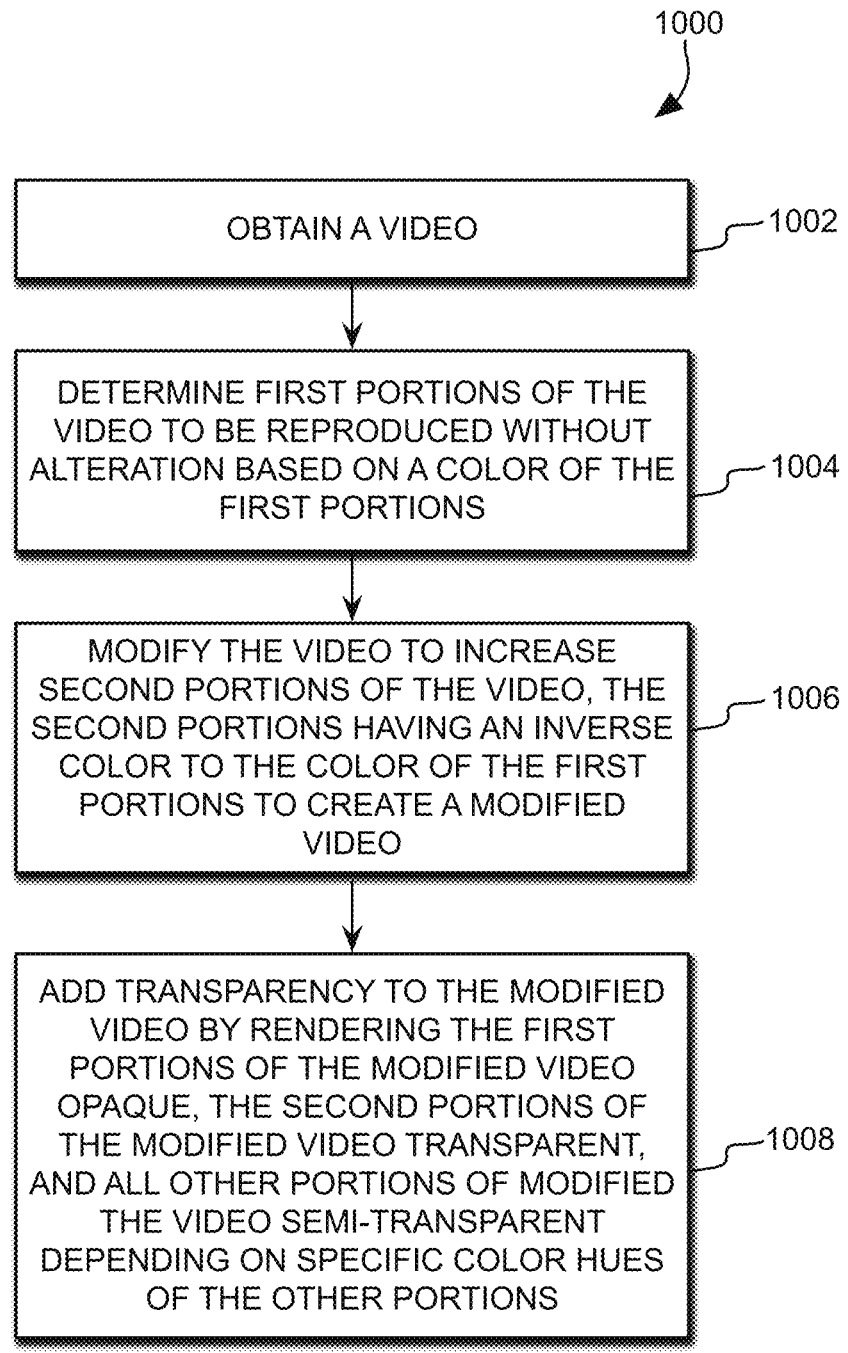
FIG. 10 is flow diagram of another example process for providing transparency to a video.

FIG. 10 is flow diagram of another example process for providing transparency to a video. In operation 1002, a video is obtained. In an example, the video may be created from scratch, assembled together using media content available to a processor, received from another electronic device, retrieved from a storage medium, or in some other way attained. In one approach, the video lacks transparency in its native definition or format as obtained.

In operation 1004, it is determined which first portions of the video will be reproduced without alteration based on a color of the first portions, and consequently which second portions of the video will be made transparent. All first portions of the video have the same color.

In one approach, this determination is made by determining a predominant background color of the video. In one approach, the predominant background color is determined by selecting a most common pixel color in the video which is not located within a central 50% of the video (e.g., along the edges of the video, so most likely not the subject or main focus of the video). In one example, the predominant background color may be white. In another example, the predominant background color may be black.

Once the predominant background color is determined, all portions of the video which include the predominant background color are selected as the second portions of the video. In this example, an inverse color to the predominant background color is chosen to represent the first portions of the video which will be reproduced without alteration. For example, white is the inverse of black, purple is the inverse of green, yellow is the inverse of blue, etc.

In optional operation 1006, the video is modified or edited to increase second portions of the video (a certain amount of pixels in the video) that have the inverse color to the color of the first portions to create a modified video. This modification increases the second portions of the video which are made transparent as well as increasing the first portions of the video which will be reproduced without alteration.

In operation 1008, transparency is added to the video (or the modified video) during playback by rendering all of the second portions of the video transparent, all of the first portions of the video opaque, and all other portions of the video semi-transparent depending on specific color hues of the other portions.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking, lingering, and/or hovering with a mouse, trackpad, touchscreen, or other input device over a user interface element, or touching, tapping or gesturing with one or more fingers or stylus on a user interface element. User interface elements can be virtual buttons, menus, selectors, switches, sliders, scrubbers, knobs, toggles, thumbnails, links, icons, radio buttons, checkboxes and any other mechanism for receiving input from, or providing feedback to a user.

Privacy

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Example System Architecture

Figure 11:
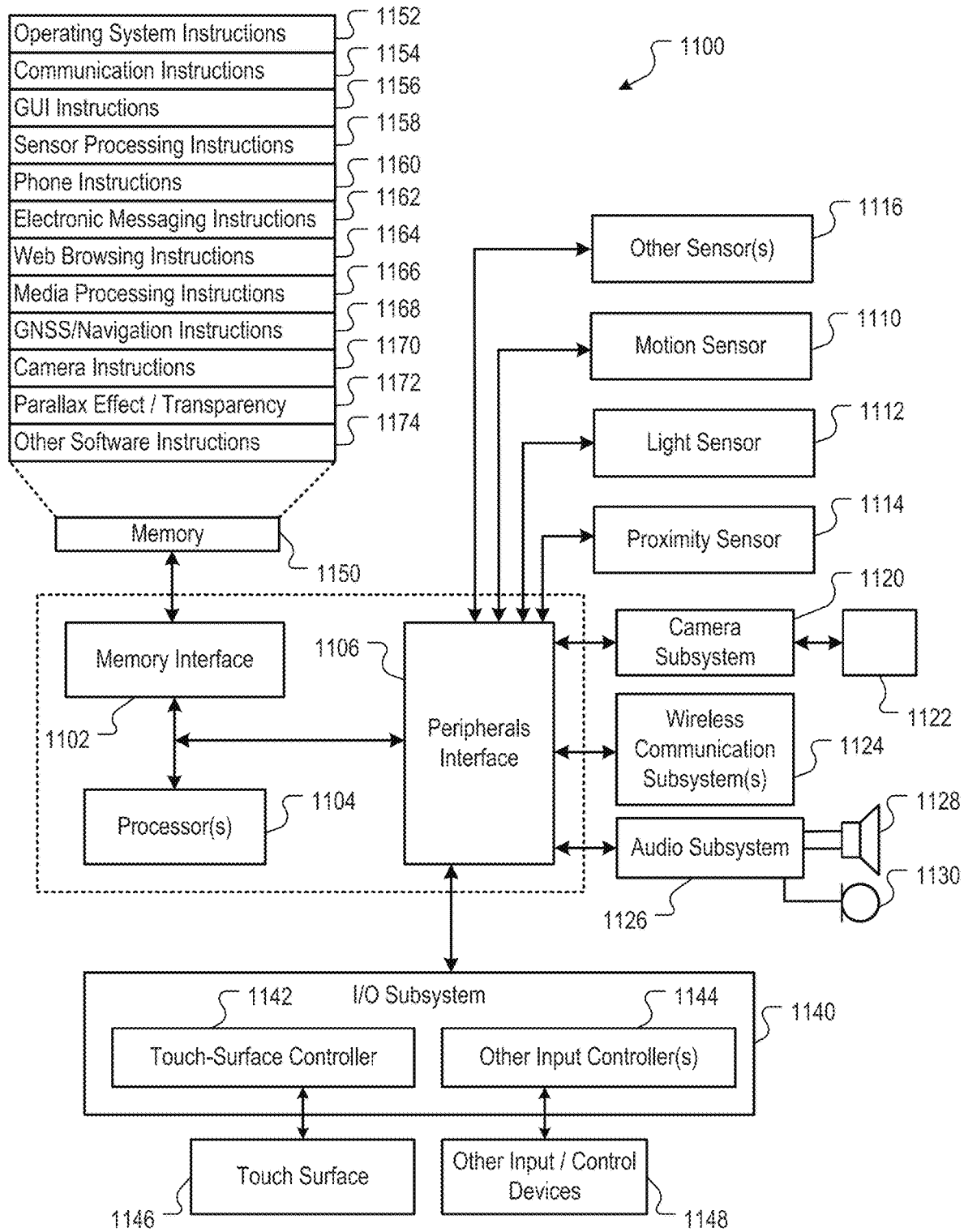
FIG. 11 is a block diagram of an example computing device that may implement the features and processes of FIGS. 1-10.

FIG. 11 is a block diagram of an example computing device 1100 that can implement the features and processes of FIGS. 1-10. The computing device 1100 can include a memory interface 1102, one or more data processors, image processors and/or central processing units 1104, and a peripherals interface 1106. The memory interface 1102, the one or more processors 1104 and/or the peripherals interface 1106 can be separate components or can be integrated in one or more integrated circuits. The various components in the computing device 1100 can be coupled by one or more communication buses or signal lines.

Sensors, devices, and subsystems can be coupled to the peripherals interface 1106 to facilitate multiple functionalities. For example, a motion sensor 1110, a light sensor 1112, and a proximity sensor 1114 can be coupled to the peripherals interface 1106 to facilitate orientation, lighting, and proximity functions. Other sensors 1116 can also be connected to the peripherals interface 1106, such as a global navigation satellite system (GNSS) (e.g., GPS receiver), a temperature sensor, a biometric sensor, magnetometer or other sensing device, to facilitate related functionalities.

A camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips. The camera subsystem 1120 and the optical sensor 1122 can be used to collect images of a user to be used during authentication of a user, e.g., by performing facial recognition analysis.

Communication functions can be facilitated through one or more wireless communication subsystems 1124, which can include radio frequency receivers and transmitters and/or optical (e.g., infrared) receivers and transmitters. The specific design and implementation of the communication subsystem 1124 can depend on the communication network(s) over which the computing device 1100 is intended to operate. For example, the computing device 1100 can include communication subsystems 1124 designed to operate over a GSM network, a GPRS network, an EDGE network, a Wi-Fi or WiMax network, and a Bluetooth™ network. In particular, the wireless communication subsystems 1124 can include hosting protocols such that the device 100 can be configured as a base station for other wireless devices.

An audio subsystem 1126 can be coupled to a speaker 1128 and a microphone 1130 to facilitate voice-enabled functions, such as speaker recognition, voice replication, digital recording, and telephony functions. The audio subsystem 1126 can be configured to facilitate processing voice commands, voiceprinting and voice authentication, for example.

The I/O subsystem 1140 can include a touch-surface controller 1142 and/or other input controller(s) 1144. The touch-surface controller 1142 can be coupled to a touch surface 1146. The touch surface 1146 and touch-surface controller 1142 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1146.

The other input controller(s) 1144 can be coupled to other input/control devices 1148, such as one or more buttons, rocker switches, thumb-wheel, infrared port, USB port, and/or a pointer device such as a stylus. The one or more buttons (not shown) can include an up/down button for volume control of the speaker 1128 and/or the microphone 1130.

In one implementation, a pressing of the button for a first duration can disengage a lock of the touch surface 1146; and a pressing of the button for a second duration that is longer than the first duration can turn power to the computing device 1100 on or off. Pressing the button for a third duration can activate a voice control, or voice command, module that enables the user to speak commands into the microphone 1130 to cause the device to execute the spoken command. The user can customize a functionality of one or more of the buttons. The touch surface 1146 can, for example, also be used to implement virtual or soft buttons and/or a keyboard.

In some implementations, the computing device 1100 can present recorded audio and/or video files, such as MP3, AAC, and MPEG files. In some implementations, the computing device 1100 can include the functionality of an MP3 player, such as an iPod™.

The memory interface 1102 can be coupled to memory 1150. The memory 1150 can include high-speed random-access memory and/or non-volatile memory, such as one or more magnetic disk storage devices, one or more optical storage devices, and/or flash memory (e.g., NAND, NOR). The memory 1150 can store an operating system 1152, such as Darwin, RTXC, LINUX, UNIX, OS X, WINDOWS, or an embedded operating system such as VxWorks.

The operating system 1152 can include instructions for handling basic system services and for performing hardware dependent tasks. In some implementations, the operating system 1152 can be a kernel (e.g., UNIX kernel). In some implementations, the operating system 1152 can include instructions for performing voice authentication. For example, operating system 1152 can implement the parallax effect in a media composition and provide transparency to videos therefor, as described with reference to FIGS. 1-10.

The memory 1150 can also store communication instructions 1154 to facilitate communicating with one or more additional devices, one or more computers and/or one or more servers. The memory 1150 can include graphical user interface instructions 1156 to facilitate graphic user interface processing; sensor processing instructions 1158 to facilitate sensor-related processing and functions; phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GNSS/Navigation instructions 1168 to facilitate GNSS and navigation-related processes and instructions; and/or camera instructions 1170 to facilitate camera-related processes and functions.

The memory 1150 can store software instructions 1172 to facilitate other processes and functions, such as the parallax effect and video transparency processes and functions as described with reference to FIGS. 1-10.

The memory 1150 can also store other software instructions 1174, such as web video instructions to facilitate web video-related processes and functions; and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1150 can include additional instructions or fewer instructions. Furthermore, various functions of the computing device 1100 can be implemented in hardware and/or in software, including in one or more signal processing and/or application specific integrated circuits.

What is claimed is:

1. A method comprising:
   obtaining, by a computing device, a media asset describing a media composition for display on an electronic display device, the media composition comprising a plurality of layers, each layer including at least one visual element;
   selecting, by the computing device, at least some of the layers of the media composition to have a parallax effect applied thereto;
   determining, by the computing device, an amount of total parallax effect to apply to the selected layers;
   determining, by the computing device, a first amount of lateral offset to apply to a first layer of the selected layers based on: a) the determined amount of total parallax effect, and b) a position of the first layer relative to other layers in the selected layers;
   determining, by the computing device, a second amount of lateral offset to apply to a second layer of the selected layers based on: a) the determined amount of total parallax effect, and b) a total number of the selected layers, wherein the respective amounts of lateral offset to apply to each of the selected layers are determined based on user input to the computing device;
   in response to the user input, shifting, by the computing device, each of the selected layers in one or more directions by their respective amounts of lateral offset; and displaying, by the computing device, the media composition showing the parallax effect on the electronic display device.

2. The method as recited in claim 1, wherein the at least one visual element includes video, animation, or a combination thereof.

3. The method as recited in claim 1, wherein, while the media composition is displayed on the electronic display device and absent current user input, the computing device continuously shifts the selected layers in a series of different directions by their respective appropriate amounts of lateral offset.

4. The method as recited in claim 1, wherein the media asset includes configuration information that indicates which of the plurality of layers to have the parallax effect applied thereto.

5. The method as recited in claim 1, wherein the selected layers are determined based on historical preference, a number of visual elements within at least one layer of the media composition, a type of the at least one visual element within at least one layer of the media composition, or a combination thereof.

6. The method as recited in claim 1, wherein the amount of total parallax effect is determined based on a size of one or more smallest layers of the plurality of layers.

7. The method as recited in claim 1, further comprising receiving, by the computing device, the user input.

8. A system comprising:
one or more processors; and
a non-transitory computer-readable medium including one or more sequences of instructions that, when executed by the one or more processors, cause the one or more processors to perform operations comprising:
obtaining, by a computing device, a media asset describing a media composition for display on an electronic display device, the media composition comprising a plurality of layers, each layer including at least one visual element;
selecting, by the computing device, at least some of the layers of the media composition to have a parallax effect applied thereto;
determining, by the computing device, an amount of total parallax effect to apply to the selected layers;
determining, by the computing device, a first amount of lateral offset to apply to a first layer of the selected layers based on: a) the determined amount of total parallax effect, and b) a position of the first layer relative to other layers in the selected layers;
determining, by the computing device, a second amount of lateral offset to apply to a second layer of the selected layers based on: a) the determined amount of total parallax effect, and b) a total number of the selected layers, wherein the respective amounts of lateral offset to apply to each of the selected layers are determined based on user input to the computing device;
in response to the user input, shifting, by the computing device, each of the selected layers in one or more directions by their respective amounts of lateral offset; and
displaying, by the computing device, the media composition showing the parallax effect on the electronic display device.

9. The system as recited in claim 8, wherein the at least one visual element includes video, animation, or a combination thereof.

10. The system as recited in claim 8, wherein, while the media composition is displayed on the electronic display device and absent current user input, the computing device continuously shifts the selected layers in a series of different directions by their respective appropriate amounts of lateral offset.

11. The system as recited in claim 8, wherein the media asset includes configuration information that indicates which of the plurality of layers to have the parallax effect applied thereto.

12. The system as recited in claim 8, wherein the selected layers are determined based on historical preference, a number of visual elements within at least one layer of the media composition, a type of the at least one visual element within at least one layer of the media composition, or a combination thereof.

13. The system as recited in claim 8, wherein the amount of total parallax effect is determined based on a size of one or more smallest layers of the plurality of layers.

14. The system as recited in claim 8, wherein the operations further comprise receiving, by the computing device, the user input.

15. A non-transitory computer-readable medium including one or more sequences of instructions that, when executed by one or more processors, cause the one or more processors to perform operations comprising:
obtaining, by a computing device, a media asset describing a media composition for display on an electronic display device, the media composition comprising a plurality of layers, each layer including at least one visual element;
selecting, by the computing device, at least some of the layers of the media composition to have a parallax effect applied thereto;
determining, by the computing device, an amount of total parallax effect to apply to the selected layers;
determining, by the computing device, a first amount of lateral offset to apply to a first layer of the selected layers based on: a) the determined amount of total parallax effect, and b) a position of the first layer relative to other layers in the selected layers;
determining, by the computing device, a second amount of lateral offset to apply to a second layer of the selected layers based on: a) the determined amount of total parallax effect, and b) a total number of the selected layers, wherein the respective amounts of lateral offset to apply to each of the selected layers are determined based on user input to the computing device;
in response to the user input, shifting, by the computing device, each of the selected layers in one or more directions by their respective amounts of lateral offset; and
displaying, by the computing device, the media composition showing the parallax effect on the electronic display device.

16. The non-transitory computer-readable medium as recited in claim 15, wherein the at least one visual element includes video, animation, or a combination thereof.

17. The non-transitory computer-readable medium as recited in claim 15, wherein, while the media composition is displayed on the electronic display device and absent current user input, the computing device continuously shifts the selected layers in a series of different directions by their respective appropriate amounts of lateral offset.

18. The non-transitory computer-readable medium as recited in claim 15, wherein the media asset includes configuration information that indicates which of the plurality of layers to have the parallax effect applied thereto.

19. The non-transitory computer-readable medium as recited in claim 15, wherein the selected layers are determined based on historical preference, a number of visual elements within at least one layer of the media composition, a type of the at least one visual element within at least one layer of the media composition, or a combination thereof.

20. The non-transitory computer-readable medium as recited in claim 15, wherein the amount of total parallax effect is determined based on a size of one or more smallest layers of the plurality of layers.

\* \* \* \* \*